(12) United States Patent
Li et al.

(10) Patent No.: US 11,787,890 B2
(45) Date of Patent: *Oct. 17, 2023

(54) HIGH PERFORMANCE AND RECYCLABLE THERMOSET INK FOR 3D OR 4D PRINTING

(71) Applicants: Ang Li, Baton Rouge, LA (US); Guoqiang Li, Baton Rouge, LA (US)

(72) Inventors: Ang Li, Baton Rouge, LA (US); Guoqiang Li, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,741

(22) Filed: May 5, 2022

(65) Prior Publication Data

US 2022/0403080 A1  Dec. 22, 2022

Related U.S. Application Data

(63) Continuation of application No. 17/051,709, filed as application No. PCT/US2019/029999 on Apr. 30, 2019, now Pat. No. 11,332,565.

(60) Provisional application No. 62/664,721, filed on Apr. 30, 2018.

(51) Int. Cl.
| | |
|---|---|
| C08F 2/46 | (2006.01) |
| C08F 2/50 | (2006.01) |
| C08G 61/04 | (2006.01) |
| C08F 222/10 | (2006.01) |
| C08J 11/04 | (2006.01) |
| C08K 5/05 | (2006.01) |
| C08K 5/07 | (2006.01) |
| C08K 5/17 | (2006.01) |
| C08K 5/5397 | (2006.01) |
| B33Y 70/00 | (2020.01) |
| B33Y 80/00 | (2015.01) |

(52) U.S. Cl.
CPC ............ *C08F 222/102* (2020.02); *C08F 2/50* (2013.01); *C08J 11/04* (2013.01); *C08K 5/05* (2013.01); *C08K 5/07* (2013.01); *C08K 5/17* (2013.01); *C08K 5/5397* (2013.01); *B33Y 70/00* (2014.12); *B33Y 80/00* (2014.12)

(58) Field of Classification Search
CPC .......... C08K 5/5397; C08K 5/07; C08K 5/17; C08K 5/05; C08F 2/50; C08F 22/1006; C08F 222/102; C08F 222/1067; C09D 11/03; C09D 11/101; C09D 4/00; C09J 4/00; C08J 11/04; C08J 11/10; C08J 2300/24; Y02W 30/62; B33Y 80/00; B33Y 70/00

USPC ................. 522/33, 6, 189, 184, 71, 1; 520/1
See application file for complete search history.

(56) References Cited

U.S. PATENT DOCUMENTS

| | | | | |
|---|---|---|---|---|
| 11,332,565 B2* | 5/2022 | Li | ................. | C08F 22/1006 |
| 2012/0277343 A1 | 11/2012 | Rusin et al. | | |
| 2014/0303268 A1 | 10/2014 | Hearon | | |
| 2016/0039961 A1 | 2/2016 | Bowman et al. | | |
| 2017/0044361 A1* | 2/2017 | Duquenne | ............... | C08L 63/00 |

FOREIGN PATENT DOCUMENTS

| | | |
|---|---|---|
| JP | 2007-248849 A | 9/2007 |
| WO | 2014/131020 A2 | 8/2014 |

OTHER PUBLICATIONS

Zarek et al., "4D Printing of Shape Memory-Based Personalized Endoluminal Medical Devices", Macromolecular Rapid Communications, (2017), vol. 38, (6 pages).
Zhang et al., "Advances in healing-on-demand polymers and polymer composites", Prog. Polym. Sci. (2016), vol. 57, pp. 32-63.
Zhang et al., Polym. Chem. 2015, 6, 4177-4184.
Li et al., "Synthesis and Characterization of Cleavabe Core-Cross-Linked Micelles Based on Amphiphilic Block Copolypeptoids as Smart Drug Carriers", Bio Macromolecules (2016), vol. 17, pp. 852-861.
Li et al., "Recyclable thermoset shape memory polymers with high stress and energy output via facile UV curing", J. Mater. Chem. A (2018), vol. 6, pp. 11479-11487.
Fujimori, JP 2007-248849 Machone Translation (Year: 2007).
International Search Report dated Jul. 30, 2019 in corresponding International Application No. PCT/US2019/029999.
Written Opinion dated Jul. 30, 2019 in corresponding International Application No. PCT/US2019/029999.
Akashi et al., "Polymer Gel Light-Modulation Materials Imitating Pigment Cells", Adv. Mater. (2002) vol. 14, No. 24, pp. 1808-1811.

(Continued)

*Primary Examiner* — Jessica Whiteley
(74) *Attorney, Agent, or Firm* — Venable LLP; Keith G. Haddaway; Brenden G. McDearmon

(57) ABSTRACT

A UV-curable and recyclable thermoset shape memory polymer is provided. The polymer includes a vitrimer-based monomer and a photoinitiator. The vitrimer-based monomer includes a first unit rendering a high chain stiffness upon polymerization of the monomer, and a second photopolymerizable unit for photopolymerization of the monomer under a UV irradiation. The polymer has high strength, high stiffness, high recovery stress, high energy storage, reasonable recycling efficiency, and is printable using SLA with high resolution.

18 Claims, 20 Drawing Sheets

(56) References Cited

OTHER PUBLICATIONS

Chan "Investigating Smart Textiles Based on Shape Memory Materials", Textile Research Journal (2007), vol. 77 (5), pp. 290-300.
Anthamatten et al., "Energy Storage Capacity of Shape-Memory Polymers", J. Macromolecules (2013) vol. 46, pp. 4230-4234.
Bai et al., "Dynamically Cross-Linked Elastomer Hybrids with Light-Induced Rapid and Efficient Self-Healing Ability and Reprogrammable Shape Memory Behavior", ACS Appl. Mater. Interfaces (2017), vol. 9, No. 32, pp. 27213-27222.
Bai et al., "Poly(vinyl Butyral) based polymer networks with dual-responsive shape memory and self-healing properties", J. Materials Chem. A (2014) vol. 2, pp. 9169-9177.
Cho et al., "Electroactive Shape-Memory Polyurethane Composites Incorporating Carbon Nanotubes", Macromol. Rapid. Commun. (2005) vol. 26, No. 5, pp. 412-416.
Defize et al., "Reversible TAD Chemistry as a Convenient Tool for the Design of (Re)processable PCL-Based Shape-Memory Materials", Macromol. Rapid. Commun. (2017), vol. 38, No. 1, 1600517 (7 pages).
Ding et al., "Direct 4D printing via active composite materials", Sci Adv, (2017), vol. 3: 1602890, (6 pages).
Fan et al., "High enthalpy storage thermoset network with giant stress and energy output in rubbery state", Nat. Communic. (2018), vol. 9, No. 642, pp. 1-8.
Fang et al., "Healable, Reconfigurable, Reprocessable Thermoset Shape Memory Polymer with Highly Tunable Topological Rearrangement Kinetics", ACS Appl. Mater. Interfaces (2017), vol. 9, No. 27, pp. 22077-22082.
Hashmi et al., "Improved recovery stress in multi-walled-carbon-nanotubes reinforced polyurethane", Mater. Des. (2015), vol. 67, pp. 492-500.
Huang et al., "Ultrafast Digital Printing Toward 4D Shape Changing Materials", Advanced Materials, (2017) vol. 29, 1605390 (6 pages).
Ihsan et al., "Self-Healing Behaviors of Tough Plyampholyte Hydrogels", Macromolecules (2016), vol. 49, pp. 4245-4252.
Jin et al., "Programming a crystalline shape memory polymer network with thermo- and photo-reversible bonds toward a single-component soft root", Sci. Adv. (2018), vol. 4 (6 pages).
Kloxin et al., "Covalent Adaptable Netwroks (CANs): A Unique Paradign in Cross-Linked Polyemers", Macromolecules (2010), vol. 43, pp. 2643-2653.
Lendlein et al., "Light-induced shape-memory polymers", Nature (2005), vol. 434 pp. 879-882.
Lendlein et al., "Biodegradable, Elastic Shape-Memory Polymers for Potential Biomedical Applications", Science (2002), vol. 296, pp. 1673-1676.
Li et al., "Direct Ink Write 3D Printed Cellulose Nanofiber Aerogel Structures with Highly Deformable, Shape Recoverable and Functionalizable Properties", ACS Sustainable Chemistry & Engineering, (2018), vol. 6, pp. 2011-2022.
Li et al., "Cold, Warm, and Hot Programming of Shape Memory Polymers", J. Polym. Sci. B: Polym. Phys. (2016), vol. 54, pp. 1319-1339.
Likitapom et al., "Recovery stress enhancement in shape memory composites from silicon carbide whisker-filled benzoxazine-epoxy polymer alloy", J. Intell. Mater. Syst. Struct. (2018), vol. 29(3), pp. 388-396.
Liu et al., "High Performance Shape Memory Epoxy/Carbon Nanotube Nanocomposites", ACS Appl. Mater. Interfaces (2016), vol. 8, pp. 311-320.
Lu et al., "Intrinsic Healable and Recyclable Thermoset Epoxy Based on Shape Memory Effect and Transesterification Reaction", Polymer, (2016), vol. 105, pp. 10-18.
Lu et al., "Recyclable High Performance Epoxy Based on Transesterification Reaction", J. Mater. Chem. A, (2017), vol. 5, pp. 21505-21513.
Lu et al., "Sensing and actuating capabilities of a shape memory polymer composite integrated with hybrid fillller", J. Smart Mater. Struct. (2010), vol. 19, (7 pages).
Luo et al., "Shape Memory Assisted Self-Healing Coating", ACS Macro Lett. (2013), vol. 2, pp. 152-156.
Mather et al., "Shape Memory Polymer Research", Annu. Rev. Mater. Res. (2009), vol. 39, pp. 445-471.
Mohr et al., "Initiation of shape-memory effect by inductive heating of magnetic nanoparticles in thermoplastic polymers", A. Proc. Natl. Acad. Sci. U.S.A. (2006), vol. 103, No. 10, pp. 3540-3545.
Momeni et al., "A review of 4D printing", Materials and Design, (2017), vol. 122, pp. 42-79.
Montarnal et al., "Silica-Like Malleable Materials from Permanent Organic Networks", Science, (2011), vol. 334, pp. 965-968.
Mu et al., "Porous polymeric materials by 3D printing of photocurable resin", Mater. Horizons (2017), vol. 4, pp. 442-449.
Qi et al., "Microfibrillated cellulose-reinforced bio-based poly(propylene carbonate) with dual shape memory and self-healing properties" J. Mater. Chem. A (2014), vol. 2, pp. 20393-20401.
Rodriguez et al., "Linear/Network Poly(E-caprolactone) Blends Exhibiting Shape Memory Assisted Self-Healing (SMASH)", ACS Appl. Mater. Interfaces (2011), vol. 3, pp. 152-161.
Santiago et al., "Recovery Stress and Work Output in Hyperbranched Poly(ethyleneimine)-Modified Shape-Memory Epoxy Polymers", J. Polym. Sci. B: Polym. Phys. (2016), vol. 54, pp. 1002-1013.
Shi et al., "Solvent Assisted Pressure-Free Surface Welding and Reprocessing of Malleable Epoxy Polymers", Macromolecules (2016), vol. 49, pp. 5527-5537.
Sokolowski et al., "Advanced Self-Deployable Structures for Space Applications" J. of Spacecraft and Rockets. (2007), vol. 44, 4, pp. 750-754.
Studer et al., "Overcoming Oxygen inhibition in UV-Curing of acrylate coatings by carbon dioxide inerting, Part I", Progress in Organic Coatings (2003), vol. 48, pp. 92-100.
Taleghani et al., "Smart Expandable Cement Additive to Achieve Better Wellbore Integrity", J. of Energy Resources Technology (2017), vol. 139 (6), 062903-1-062903-8.
Véchambre et al., "Understanding the Mechanisms Involved in Shape Memory Starch: Macromolecular Orientation, Stress Recovery and molecular Mobility", Macromolecules (2011), vol. 44, pp. 9384-9389.
Wang et al., "Intelligent ruber with tailored properties for self-healing and shape memory", J. Mater. Chem. A (2015), vol. 3, pp. 12864-12872.
Wang et al., "High performance shape memory polyimides based on ?-? interactions", J. Mater. Chem. A (2015), vol. 3, pp. 352-359.
Wang et al., Shape-Memory- and Hydrogen Bonding-Based Strong Reversible Adhesive System, Langmuir (2010), vol. 26, pp. 2999-3002.
Ware et al., "Three-Dimentional Flexible Electronics Enabled by Shape Memory Polymer Substrates for Responsive Meural Interfaces", Macromolecular Materials and Engineering. (2012), vol. 297 (12), pp. 1193-1202.
Xu et al., "Chemical recycling of carbon fibre/epoxy composites in a mixed solution of peroxide hydrogen and N,N-dimethylformamide", Composites Science and Technology, (2013), vol. 82, pp. 54-59.
Yang et al., "3D Printed Photoresponsive Devices Based on Shape Memory Composites", Advanced Materials, (2017), vol. 29, (7 pages).
Yang et al., "Molecular dynamics studying on welding behavior in thermosetting polymers due to bond exchange reactions", RSC Advances, (2016), vol. 6, pp. 22476-22487.
Yu et al., "Reprocessing and recycling of thermosetting polymers based on bond exchange reactions", RSC Advances, (2016), vol. 4, pp. 10108-10117.
Yu et al., "Highly Flexible Silver Nanowire Electrodes for Hape-Memory Polymer Light-Emitting Diodes", Adv. Mater. (2011), vol. 23 (5), pp. 664-668.
Zarek et al., "3D printing of shape memory polymers for flexible electronic devices", Advanced Materials, (2016), vol. 28 (22), pp. 4449-4454.

\* cited by examiner

HIGH PERFORMANCE AND RECYCLABLE THERMOSET INK FOR 3D OR 4D PRINTING

This patent application is a Continuation of U.S. patent application Ser. No. 17/051,709, filed Oct. 29, 2020, now issued as U.S. Pat. No. 11,332,565, which is a U.S. National Stage Application of PCT/US2019/029999, filed Apr. 30, 2019, which claims the benefit of Provisional Application No. 62/664,721, filed Apr. 30, 2018, the content of which is incorporated by reference herein.

BACKGROUND

1. Technical Field

The present disclosure relates to additive manufacturing technology, and more specifically to high performance and recyclable thermoset ink for 3D or 4D printing.

2. Introduction

Since the terminology of 4D printing was coined by Tibbits in 2013 (Tibbits S. The emergence of "4D printing". *TED Conference*, (2013)), the subject has attracted considerable attention in both academia and industry (Momeni F, Hassani. N MSM, Liu X, Ni J. A review of 4D printing. *Materials and Design,* 122: 42-79, (2017)). 4D printing is originally defined as 3D printing plus time, which means that the material changes its shape with time, such as stimuli-responsive materials like shape memory polymers (SMPs). In other words, if the shape memory effect is not triggered, the printing is called 3D; otherwise, it is called 4D. Chen et al. has developed a light-induced, shape memory composite based on polyurethane/carbon black composites, which can be 3D printed by a fused deposition method (Yang H, Leow W R, Wang T, Wang J, Yu J, He K, Qi D. Wan C. Chen X. 3D Printed Photoresponsive Devices Based on Shape Memory Composites. *Advanced Materials,* 29: 1701627, (2017)). Qi et al. developed shape memory porous materials and aerogels that can be 3D printed into functional pyramidal and trefoil structures (Mu X, Bertron T, Dunn C, Qiao H, Wu J, Zhao Z. Saldana C, Qi H. Porous polymeric materials by 3D printing of photocurable resin. *Materials Horizons,* 4: 442-449, (2017); Ding Z, Yuan C, Peng X, Wang T, Qi H J, Dunn M L. Direct 4D printing via active composite materials. *Science Advances,* 3: 1602890, (2017)). A shape memory flower structure and a shape memory stent have also been 3D printed (Li V, Mulyadi A, Dunn C, Deng Y, Qi H J. Direct Ink Write (DIW) 3D Printed Cellulose Nanofiber Aerogel Structures with Highly Deformable, Shape Recoverable and Functionalizable Properties. *ACS Sustainable Chemistry & Engineering*, Available on-line, (2017) DOI: 10.1021/acssuschemeng.7b03439; Zarek M, Mansour N, Shapira S, Cohn D. 4D Printing of Shape Memory-Based Personalized Endoluminal Medical Devices. *Macromolecular Rapid Communications,* 38: 1600628, (2017)). Xie et al. developed a new digital printing process, which can print SMPs at faster time scales (Huang L, Jiang R, Wu J, Song J, Bai H, Li B, Zhao Q, Xie T. Ultrafast digital printing toward 4D shape changing materials. *Advanced Materials,* 29: 1605390, (2017)). Zarek et al. developed 3D printable polycaprolactone with dimethacrylate functional groups (Zarek M, Layani M, Cooperstein I, Sachyani E, Cohn D, Magdassi S. 3D printing of shape memory polymers for flexible electronic devices. *Advanced Materials,* 28: 4449-4454, (2016)). However, most studies use hydrogels and elastomers that lack mechanical strength, making them inadequate for heavy-duty engineering structures, for example, in the auto or aerospace industries. The fabrication of high-performance, 3D printable thermoset SMPs remains a challenge. Conventional thermoset SMPs, while having high mechanical strength and stiffness (for example, tensile strength in tens of MPa and modulus of elasticity in several GPa at ambient temperature), are not healable (e.g., damage or crack can be healed at molecular length scale) or recyclable (e.g., can be remolded, reprocessed, or reused at the end of design service life). Therefore, design and synthesis of thermoset SMPs, which are printable, healable, and recyclable are highly desired.

In recent years, intrinsic healable thermoset polymers based on covalent adaptable networks (CANs) or dynamic covalent bond exchange (DCBE), also known as vitrimers (MontarnalD, Capelot M, Tournilhac F, and Leibler L. Silica-like malleable materials from permanent organic networks. *Science,* 334: 965-968, (2011)), have been developed. These polymers rearrange their topology by exchange reactions or reversible covalent links without depolymerization. Networks with covalent bonds that are able to break and reform or to exchange pairs of atoms can relax stress and enable remolding or recycling (MontarnalD, Capelot M, Tournilhac F, and Leibler L. Silica-like malleable materials from permanent organic networks. *Science,* 334: 965-968, (2011)). However, the several conventional healable and recyclable systems are based on flexible networks which are not suitable for load bearing structures (MontarnalD, Capelot M, Tournilhac F, and Leibler L. Silica-like malleable materials from permanent organic networks. *Science,* 334: 965-968, (2011); Yu K, Taynton P, Zhang W, Dunn M L, and Qi H J. Reprocessing and recycling of thermosetting polymers based on bond exchange reactions. *RSC Advances,* 4: 10108-10117, (2014); Yang H, Yu K, Mu X, Wei Y, Guo Y, and Qi H J. Molecular dynamics studying on welding behavior in thermosetting polymers due to bond exchange reactions. *RSC Advances,* 6: 22476-22487, (2016)). Lu et al. has previously developed a new self-healing epoxy with shape memory effect, to facilitate crack closure (Lu L, Fan J, and Li G. Intrinsic Healable and Recyclable Thermoset Epoxy Based on Shape Memory Effect and Transesterification Reaction. Polymer, 105:10-18, (2016)). By using phthalic anhydride as the curing agent of conventional epoxy, Lu et al. has developed healable and recyclable epoxy, which has strength and stiffness comparable to those of conventional epoxy (Lu L, Pan J, and Li G. Recyclable High Performance Epoxy Based on Transesterification Reaction. *Journal of Materials Chemistry A,* 5: 21505-21513, (2017)). However, these recyclable thermosets are not printable.

In addition, there are some commercial thermoset "inks" available in the marketplace. However, they usually do not have shape memory effect, do not have high strength and high stiffness, and are not recyclable. Furthermore, these inks are usually very expensive, in the range of hundreds of dollars per gallon. Therefore, structures and devices using 3D printing of thermoset polymers are still rare. On the other hand, this type of multifunctional polymer ink is highly desired. For example, for the future human inhabitant in Mars or beyond, shape memory polymer can make the structures or devices compact during taking off and transportation process, and deployable once arrival in the destination planet; recyclable and printable polymers make human survive with limited resources. Therefore, there is a clear need to develop printable, recyclable, and shape memory thermosets with mechanical properties comparable to those of conventional engineering thermosets.

SUMMARY

According to a first aspect of the invention, a UV-curable and recyclable thermoset shape memory polymer is provided. The polymer includes one vitrimer-based monomer or a combination of vitrimer-based monomers and a photoinitiator or a mixture of photoinitiators. The vitrimer-based monomer includes a first unit rendering a high chain stiffness upon polymerization of the monomer, and a second unit comprising a photopolymerizable unit for photopolymerization of the monomer under a UV irradiation.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
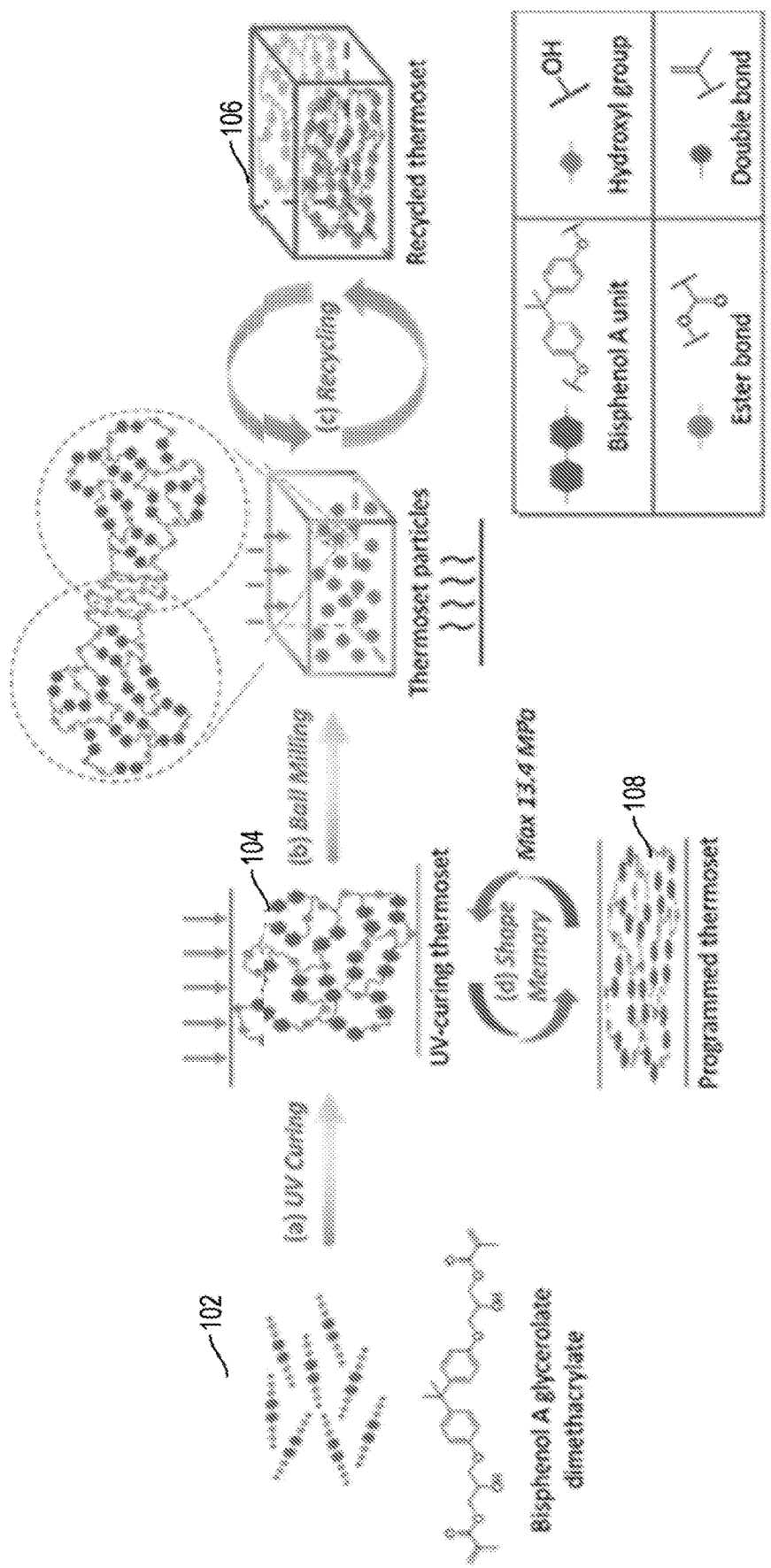
FIG. 1 illustrates development of an exemplary vitrimer-based thermoset shape memory polymer (VSMP) thermoset material.

Engineering applications of current thermoset shape memory polymers are limited by three critical issues: demanding fabrication conditions (70 to 300° C. for hours or days), lack of reprocessability or recyclability, and low recovery stress and energy output. To address these problems simultaneously, a new UV curable and vitrimer-based thermoset shape memory polymer (VSMP) is provided in this disclosure. For example, in an embodiment, a 1.1 mm thick VSMP layer can be readily cured at room temperature under UV-irradiation (e.g., 61 mW·cm$^{-2}$) for only about 80 s. The power of UV-irradiation can be from about 1 mW·cm$^{-2}$ to more than 1000 mW·cm$^{-2}$ with the wavelength of the UV source at around 260 nm or 380 nm. The curing time may vary depending upon a different UV power. The polymer possesses from about 15 MPa to about 50 MPa, for example about 36.7 MPa, tensile strength, from about 100 MPa to about 400 MPa, for example about 230 MPa, compressive strength, and from about 1000 MPa to about 5000 MPa, for example about 3120 MPa, modulus at room temperature. It also has a compressive strength of about 187 MPa at about 120° C. The CAN imparts the VSMP with recyclability, as reflected by two effective recycling cycles (e.g., greater than about 60% recycling efficiency). In addition, the VSMP exhibits good shape memory properties for multiple shape recovery cycles. With about 20% compression programming strain, up to about 13.4 MPa stable recovery stress and about 1.05 MJ·m$^{-3}$ energy output in the rubbery state are achieved. With the good mechanical strength, thermal stability, recyclability, excellent shape memory properties, and in-situ UV-curing capabilities combined, the new VSMP may be a promising multifunctional thermoset for engineering applications.

One-way thermo-responsive SMPs can remember a temporary shape below a transition temperature ($T_{trans}$) and recover to its original shape above $T_{trans}$ under proper stimuli such as heat (Mather, P. T.; Luo, X.; Rousseau, I. A. *Annu. Rev. Mater. Res.* 2009, 39, 445-471; Li, G.; Wang, A. *J. Polym. Sci. B: Polym. Phys.* 2016, 54, 1319-1339). The shape memory effect can also be triggered by converting another type of energy, for example, electrical actuation, light, and magnetic field into heat (Lendlein, A.; Jiang, H.; Jünger, O.; Langer, R. *Nature* 2005, 434, 879-882; Cho, J. W.; Kim, J. W.; Jung, Y. C.; Goo, N. S. *Macromol. Rapid. Commun.* 2005, 26, 412-416; Mohr, R.; Kratz, K.; Weigel, T.; Lucka-Gabor, M.; Moneke, M.; Lendlein, A. *Proc. Natl. Acad. Sci. U.S.A.* 2006, 103, 3540-3545). Due to the controllable shape transformation, SMPs have attracted much attention to fabricating electronic devices, sensors, fabrics, sealant, deployable structures, biomedical devices and self-healing composites (Yu, Z.; Zhang, Q.; Li, L.; Chen, Q.; Niu, X.; Liu, J.; Pei, Q. *Adv. Mater.* 2011, 23, 664-668; Ware, T.; Simon, D.; Hearon, K.; Liu, C.; Shah, S.; Reeder, J.; Khodaparast, N.; Kilgard, M. P.; Maitland, D. J.; Rennaker, R. L. *Macromol. Mater. Eng.* 2012, 297, 1193-1202; Lu, H.; Yu, K.; Liu, Y.; Leng, J. *Smart Mater. Struct.* 2010, 19, 065014; Akashi, R.; Tsutsui, H.; Komura, A. *Adv. Mater.* 2002, 14, 1808-1811; Chan Vili, Y. Y. *Text. Res. J.* 2007, 77, 290-300; Lendlein, A.; Langer, R. *Science* 2002, 296, 1673-1676; Li, G. *Self-healing composites: shape memory polymer based structures*; John Wiley & Sons, 2014). Moreover, recent studies have shown the great potential for SMPs to be used in oil drilling and aerospace transportation (Taleghani, A. D.; Li, G.; Moayeri, M. *J. Energy. Resour. Technol.* 2017, 139, 062903; Sokolowski, W. M.; Tan, S. C. *J. Spacecr. Rockets.* 2007, 44, 750). However, most of the current SMPs are made of elastomers, hydrogels, or thermoplastic polymers, which are unable to provide sufficient mechanical strength, stiffness, durability, and recovery stress for engineering applications. Although a few high performance shape memory polymers (HPSMPs) or their composites have been reported (Qi, X.; Yang, G.; Jing, M.; Fu, Q.; Chiu, F.-C. *J. Mater. Chem. A* 2014, 2, 20393-20401; Liu, Y.; Zhao, J.; Zhao, L.; Li, W.; Zhang, H.; Yu, X.; Zhang, Z. *ACS Appl. Mater. Interfaces* 2015, 8, 311-320), more HPSMPs are still highly desired given the large demand in heavy-duty engineering structures, such as the auto industry, construction, aerospace, etc.

Recent advances in HPSMPs primarily focus on increasing the mechanical properties of HPSMPs (Zhang, T.; Wen, Z.; Hui, Y.; Yang, M.; Yang, K.; Zhou, Q.; Wang, Y. *Polym. Chem.* 2015, 6, 4177-4184; Wang, Q.; Bai, Y.; Chen, Y.; Ju, J.; Zheng, F.; Wang, T. *J. Mater. Chem. A* 2015, 3, 352-359; Bai, Y.; Chen, Y.; Wang, Q.; Wang, T. *J. Mater. Chem. A* 2014, 2, 9169-9177), but the shape recovery stress of these HPSMPs has not been fully addressed. Shape recovery stress or the energy output which quantifies the work produced during the shape recovery process is a critical parameter for HPSMPs to be used for engineering structures with multifunctionality. A real HPSMP may be considered to possess both high mechanical strength and high shape recovery stress. Most of the current HPSMPs yield the recovery stress from tenths to several MPa in the rubbery state (typically less than 5 MPa), which is not adequate for heavy duty structural applications (Likitaporn, C.; Mora, P.; Tiptipakorn, S.; Rimdusit, S. *J. Intell. Mater. Syst. Struct.* 2017, 1045389X17708041; Véchambre, C.; Buléon, A.; Chaunier, L.; Gauthier, C.; Lourdin, D. *Macromolecules* 2011, 44, 9384-9389; Lu, L.; Fan, J.; Li, G. *Polymer* 2016, 105, 10-18). SMPs with up to 7 MPa recovery stress is usually considered as high recovery stress output (Santiago, D.; Fabregat-Sanjuan, A.; Ferrando, F.; De la Flor, S. *J. Polym. Sci. B: Polym. Phys.* 2016, 54, 1002-1013; Hashmi, S.; Prasad, H. C.; Abishera, R.; Bhargaw, H. N.; Naik, A. *Mater. Des.* 2015, 67, 492-500). It is commonly accepted that the energy input of amorphous SMPs is stored through entropy reduction and the recovery stress is produced through constrained shape recovery (Anthamatten, M.; Roddecha, S.; Li, J. *Macromolecules* 2013, 46, 4230-4234). The latest study shows that high recovery stress output (e.g., >10 MPa) and energy output (e.g., >1.0 MJ/m$^3$) can be produced through enthalpy increase if high steric hindrance or intermolecular interactions within the polymer network can be achieved, providing a guidance for fabricating HPSMPs with high recovery stress (Fan, J.; Li, G. *Nat. Communic.* 2018, 9, 642). While this polymer has high recovery stress and energy output, it is not printable, nor recyclable.

Another limitation of the current HPSMPs is their complex fabrication procedures. Zhang et al. have developed HPSMPs based on poly (p-dioxanone) which exhibit high tensile strength (up to 65 MPa), but the curing of the polymer requires 72 h under a nitrogen environment at 80° C. (Zhang, T.; Wen, Z.; Hui, Y.; Yang, M.; Yang, K.; Zhou, Q.; Wang, Y. *Polym. Chem.* 2015, 6, 4177-4184). Wang et al. have reported a HPSMP composed of polyimide with excellent tensile strength (up to 180 MPa), which can only be synthesized under argon at elevated temperature (multi-step, up to 300° C.) for 31 h (Wang, Q.; Bai, Y.; Chen, Y.; Ju, J.; Zheng, F.; Wang, T. *J. Mater. Chem. A* 2015, 3, 352-359). Poly (vinyl butyral) based HPSMPs have also been developed (tensile strength up to 47 MPa), which require 24 h reaction at 70° C. (Bai, Y.; Chen, Y.; Wang, Q.; Wang, T. *J. Mater. Chem. A* 2014, 2, 9169-9177). Despite the excellent properties, the scale-up manufacturing of HPSMPs for engineering applications is mainly impeded by the complex preparation procedures and harsh fabrication conditions. A facile fabrication method is required to avoid the limitations of current HPSMPs. UV-curing, which usually proceeds via free radical polymerization or cationic polymerization, is a widely employed fabrication process in the industry (Studer, K.; Decker, C.; Beck, E.; Schwalm, R. *Prog. Org. Coat.* 2003, 48, 92-100; Fouassier, J. *Radiation curing in polymer science and technology* 1993, 1, P 49). High heat input, time-consuming reactions, and moisture-free air protection can all be avoided through the UV-curing process. More importantly, in-situ curing can be accomplished under UV irradiation, enabling future applications of HPSMPs for coatings, adhesives, and stereolithography-based additive manufacturing (Luo, X.; Mather, P. T. *ACS Macro Lett.* 2013, 2, 152-156; Wang, R.; Xie, T. *Langmuir* 2010, 26, 2999-3002; Huang, L.; Jiang, R.; Wu, J.; Song, J.; Bai, H.; Li, B.; Zhao, Q.; Xie, T. *Adv. Mater.* 2017, 29; Zarek, M.; Layani, M.; Cooperstein, I.; Sachyani, E.; Cohn, D.; Magdassi, S. *Adv. Mater.* 2016, 28, 4449-4454; Mu, X.; Bertron, T.; Dunn, C.; Qiao, H.; Wu, J.; Zhao, Z.; Saldana, C.; Qi, H. *Mater. Horizons* 2017, 4, 442-449). UV-curing presents a facile method when it can be used to fabricate HPSMPs.

Chemical cross-links endow SMPs with excellent thermal stability, high mechanical strength, and good chemical resistance. However, permanently crosslinked networks make reprocessability and recyclability impossible for the polymers. Given the large demand for HPSMPs in engineering applications, the lack of recyclability brings about a big environmental concern and life cycle cost. One feasible solution is to develop vitrimer-based SMPs. Vitrimer is a type of cross-linked polymer composed of a CAN or reversible covalent bonds (Kloxin, C. J.; Scott, T. F.; Adzima, B. J.; Bowman, C. N. *Macromolecules* 2010, 43, 2643-2653). In terms of the dynamic reversibility, reversible bonds have been widely incorporated in polymer networks to fabricate self-healing polymers, soft robots, and smart biomedicine (Zhang, P.; Li, G. *Prog. Polym. Sci.* 2016, 57, 32-63; Ihsan, A. B.; Sun, T. L.; Kurokawa, T.; Karobi, S. N.; Nakajima, T.; Nonoyama, T.; Roy, C. K.; Luo, F.; Gong, J. P. *Macromolecules* 2016, 49, 4245-4252; Jin, B.; Song, H.; Jiang, R.;

Song, J.; Zhao, Q.; Xie, T. *Sci. Adv.* 2018, 4, eaao3865; Li, A.; Zhang, D. *Biomacromolecules* 2016, 17, 852-861). Most of the current vitrimer-based SMPs are made of rubber or elastomer and lack adequate mechanical strength (e.g., less than about 4 MPa) (Fang, Z.; Zheng, N.; Zhao, Q.; Xie, T. *ACS Appl. Mater. Interfaces* 2017, 9, 22077-22082; Defize, T.; Riva, R.; Thomassin, J. M.; Alexandre, M.; Herck, N. V.; Prez, F. D.; Jérôme, C. *Macromol. Rapid. Commun.* 2017, 38; Bai, J.; Shi, Z. *ACS Appl. Mater. Interfaces* 2017, 9, 27213-27222). The abovementioned poly (p-dioxanone) and poly (vinyl butyral) based polymers are among the few reported vitrimer-based HPSMPs; however, they are not printable and their applications are significantly hindered by their complex fabrication processes (Zhang, T.; Wen, Z.; Hui, Y.; Yang, M.; Yang, K.; Zhou, Q.; Wang, Y. *Polym. Chem.* 2015, 6, 4177-4184: Bai, Y.; Chen, Y.; Wang, Q.; Wang, T. *J. Mater. Chem. A* 2014, 2, 9169-9177). Efforts have been made to fabricate vitrimer-based SMPs through facile synthetic routes. Wang et al. synthesized a self-healing SMP composed of polybutadiene via UV-curing at room temperature for only 1 h (Wang, D.; Guo, J.; Zhang, H.; Cheng, B.; Shen, H.; Zhao, N.; Xu, J. *J. Mater. Chem. A* 2015, 3, 12864-12872). Self-healing shape memory polycaprolactone has also been prepared at room temperature under UV irradiation for 1 h (Rodriguez, E. D.; Luo, X.; Mather, P. T. *ACS Appl. Mater. Interfaces* 2011, 3, 152-161). However, the facile fabrication process has not been applied to HPSMPs.

Herein in this disclosure, the development of a new high-performance UV-curable and recyclable vitrimer-based shape memory thermoset (VSMP) with high recovery stress and energy output is provided. The design is based on four highly desirable features: rigid chain segment (i.e., a segment with high resistance to segmental rotation) for high mechanical strength, photopolymerizable (e.g., acrylate/methacrylate) groups for UV-curing, CAN network for recyclability, and highly constrained network for improved recovery stress. Therefore, in some embodiments, bisphenol A glycerolate dimethacrylate (BPAGMA) is selected. In these embodiments, the bisphenol unit is widely existing in the engineering polymers (e.g. polycarbonate and epoxy), providing high chain stiffness (i.e., high resistance to deformation) to the thermoset. In these embodiments, the dimethacrylate groups allow fast and complete photopolymerization under UV irradiation, leading to a highly constrained network. Moreover, the resulting ester bonds after UV-curing and the dangling hydroxyl groups can undergo transesterification reactions and form the CAN of the thermoset, enabling recyclability of the polymer. Alternative embodiments can be used which incorporate monomers with other rigid chain segments to impart high chain stiffness such as in, for example bisphenol A glycerolate diacrylate, bisphenol A diglycidyl ether, methacrylate/acrylate-modified EPON monomers/oligomers with various chain lengths, bisphenol A dimethacrylate, acrylate/methacrylate functionalized polycarbonate or aromatic polyester, Bisphenol F ethoxylate diacrylate/dimethacrylate, Bisphenol A glycerolate (1 glycerol/phenol) diacrylate, 1,4-Phenylene dimethacrylate etc. These and other embodiments the monomer can include other photopolymerizable units such as, for example, acrylates, methacrylates, epoxides/epoxy, thiol and alkene, thiol and alkyne, thiol and acrylate/methacrylate, etc. In exemplary embodiments, the monomers may include reversibly reactive functional groups to provide recyclability, similar to the hydroxyl and ester functions of the BPAGMA.

In an example embodiment, a VSMP thermoset material is developed and its characteristics is tested, as shown in FIG. 1. BPAGMA monomers 102 are first UV-cured to form a new VSMP thermoset 104. To assess the recyclability, the VSMP thermoset is then broken and ground into particles through, for example through ball milling. A solid form recycling of the broken particles is conducted via interfacial transesterification reaction to form the recycled thermoset 106, which can be recycled again. In this example, the recycling of the VSMP particles is performed under pressure and with heat into a new thermoset with two effective recycling cycles. The shape memory properties of the VSMP thermoset are also demonstrated with several programming and shape recovery cycles, which may be referred to as programmed thermoset 108 herein. For example, hot compressive programming of the VSMP, fixation of the temporary shape, and recovery to the original shape for multiple cycles, may be performed.

In some embodiments, an example UV-curable VSMP ink may be formulated as follows, and facile UV-curing of the VSMP ink can be performed. Bisphenol A glycerolate dimethacrylate and 2-hydroxy-2-methylpropiophenone are provided. In this example, the photo-initiator (2-hydroxy-2-methylpropiophenone, 0.27 mL, about 3 wt %) is dissolved in the PAGMA (e.g., about 9 g) by stirring the mixture at about 65° C. for about 2 h. The solution is then sandwiched by two transparent plastic slides with a PTFE spacer in between (thickness: about 1.1 mm). The solution is cured in a UV chamber for a certain time (e.g., ranging from about 10 s to about 80 s) with a UV source irradiation (e.g., about 61 mW·cm$^{-2}$). A pale yellow but transparent specimen is then obtained by removing the plastic slides and the PTFE spacer.

In some embodiments, UV curing kinetics of the VSMP ink may be investigated. For example, a plurality of the VSMP sheets (thickness=about 1.1 mm) are synthesized at various UV curing time intervals (e.g., from about 3 s to about 80 s). Each sheet is cut into a small piece as the specimen whose weight is measured as $w_0$ (e.g., from about 120 to about 160 mg). Each specimen is then immersed in acetone (about 10 mL) which is a good solvent for the BPAGMA monomer, for about 21 h under agitation. The solvent is then removed using, for example, pipettes, and the immersed specimen is further dried under vacuum at about 80° C. for about 2 h. The conversion of polymerization of the ink is defined as $$p = \frac{mole_p}{mole_0} = \frac{mass_p}{mass_0},$$

where p stands for the conversion of polymerization, $mole_p$ stands for the mole of polymerized monomers, and $mole_0$ represents the mole of initial monomers, $mass_p$ stands for the weight of polymerized monomers, and $mass_0$ stands for the weight of initial monomers. By immersing the UV-cured VSMP in acetone, the unreacted monomers can be dissolved so that $mass_p$ can be obtained by measuring the weight of the cured VSMP after immersion in acetone. On the other hand, $mass_0$ is obtained by measuring the weight of the cured VSMP right after UV-curing. Therefore, the conversion of the polymerization is calculated using Equation (1):

$$\text{Polymerization Conversion} = \frac{mass_p}{mass_0} \times 100\% \quad \text{Equation (1)}$$

Figure 2:
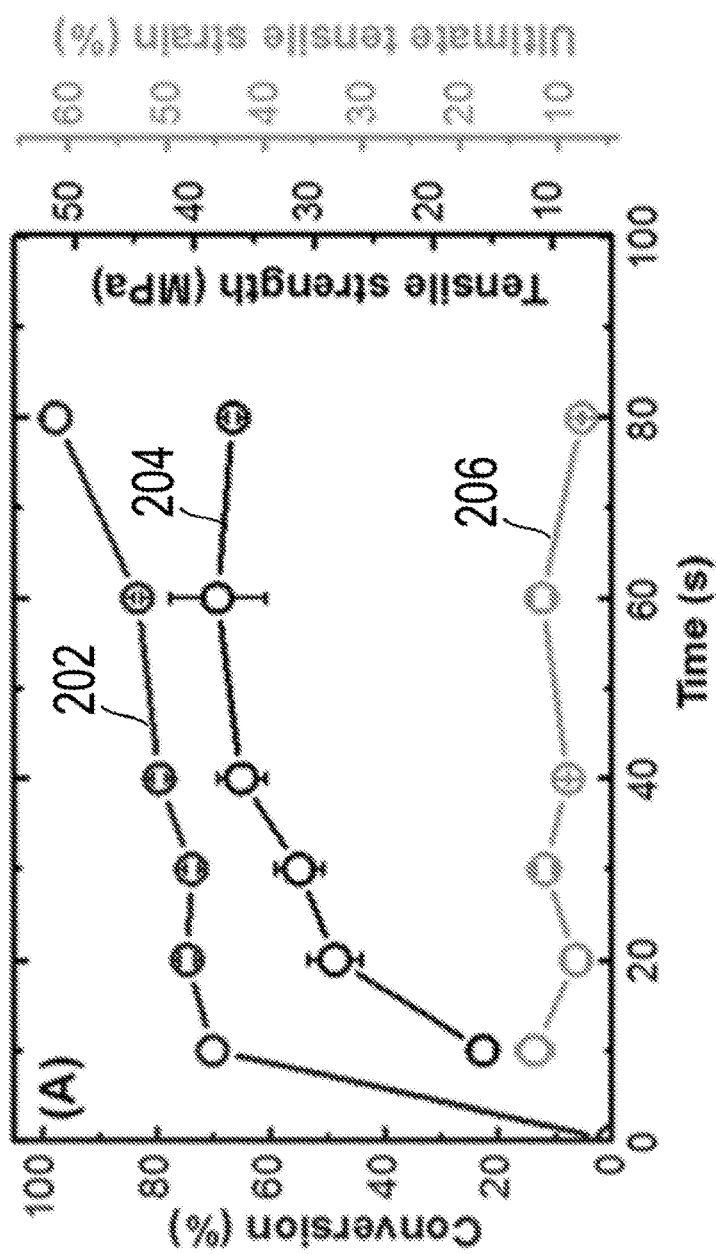
FIG. 2 illustrates a kinetic profile of a VSMP and an example cured VSMP.

The kinetics of the polymerization conversion is first investigated. FIG. 2 illustrates a kinetic profile of a VSMP (FIG. 2. (A)) and an example cured VSMP (FIG. 2. (B)). The kinetic profile 202, which is a plot of cross-linking degree as a function of time, shows the similarity to the profile of a typical chain-growth radical polymerization. More than 60% crosslinking happens within only about 10 s, and the polymerization conversion reaches 70% after about 20 s with a decrease in the polymerization rate, due to the limited chain mobility within a bulk network compared to a solution. The conversion increases to nearly 100% after 80 s exposure to the UV irradiation, resulting in a highly constrained network. Because the crosslinking process propagates through the UV-triggered radical polymerization, the crosslinking degree can be directly reflected by the polymerization conversion. The mechanical strength of the VSMP increases proportionally with the crosslinking degree from less than about 20 MPa to about 36 MPa when the crosslinking density increases from about 70% to about 80%, but it becomes almost independent of the crosslinking degree after about 40 s exposure time, as shown by a tensile strength profile 204 as a function of time. The specimen obtained at about 80 s exposure has 36.7 MPa ultimate tensile strength. On the other hand, the ultimate strain of the VSMP exhibits a trend of slight decrease as a function of the crosslinking degree, which is shown by an ultimate tensile strain 206 as a function of time. FIG. 2 (B) demonstrates an example UV-cured VSMP.

In some embodiments, compositional analysis of BPAGMA monomer and the UV-cured VSMP may be performed. The compositions of the BPAGMA monomer and the UV-cured VSMP may be analyzed using, for example, FTIR (Bruker Alpha FTIR Spectrometer) with the scanning range from about 400 to about 4000 $cm^{-1}$. The IR spectrum of BPAGMA is obtained by measuring the bulk resin and the IR spectrum of the UV-cured VSMP and is measured by using a rectangular specimen (18.30×54.31× 1.13 mm).

Figure 3:
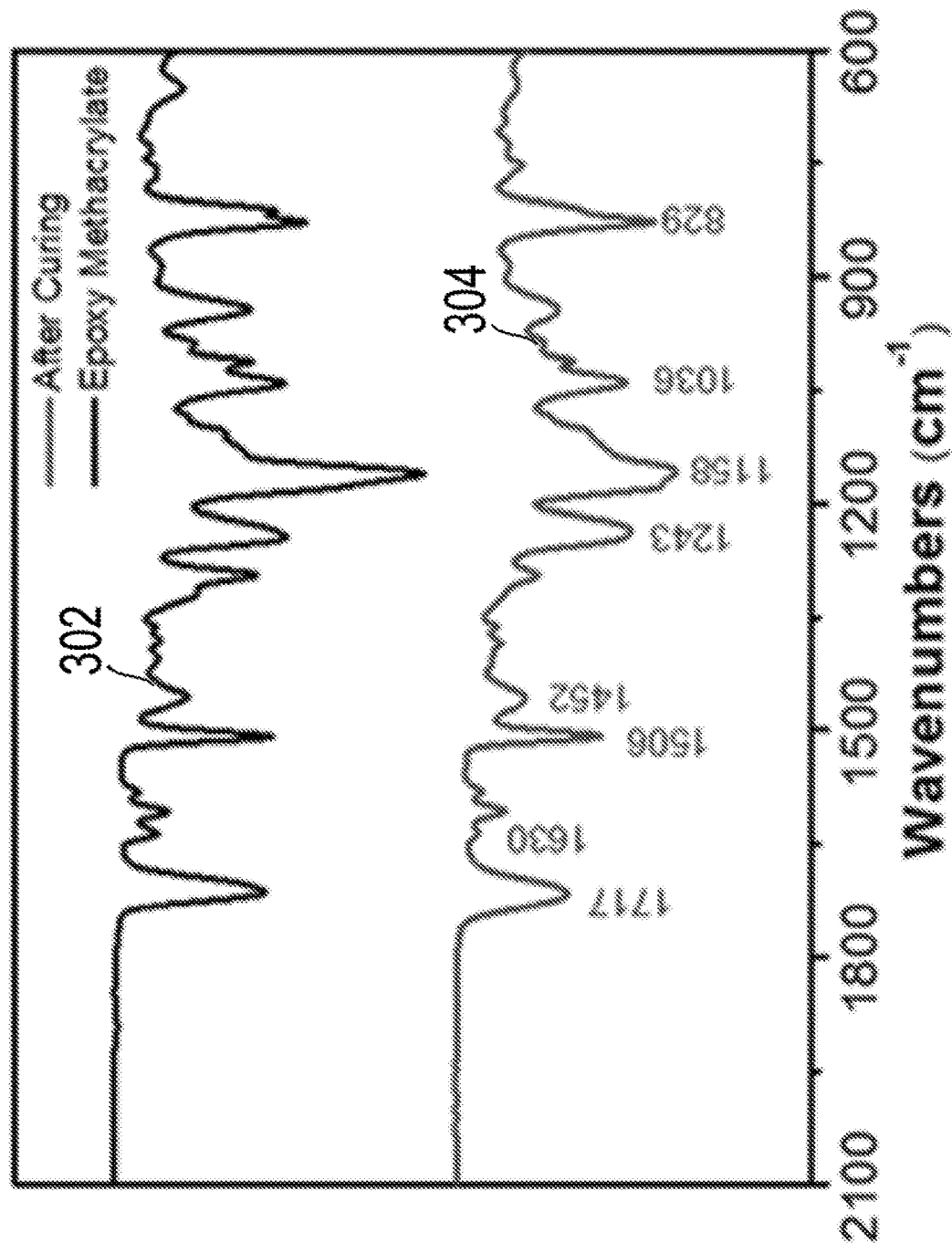
FIG. 3 illustrates compositional profiles of BPAGMA monomer and the UV-cured VSMP.

In this example, the compositional analysis of BPAGMA monomer and the UV-cured VSMP is conducted using FTIR, as shown in FIG. 3 by profiles 302 and 304, respectively. The UV-curing is suggested according to the decrease in the peak at 1630 $cm^{-1}$, which is corresponding to the —C=C— bond of the methacrylate functional group. The other characteristic peaks of the VSMP are also assigned. Peaks at 1508 $cm^{-1}$, and 1450 $cm^{-1}$ are due to the aromatic —C=C— stretch, the peak at 1294 $cm^{-1}$ is due to the aryl-O-group, the peaks at 1234 $cm^{-1}$ and 1036 $cm^{-1}$ are due to the aromatic —C—O— stretch, and the peaks at 1158 $cm^{-1}$ and 829 $cm^{-1}$ are due to the aliphatic —C—O— stretch.

In some embodiments, thermal analysis and thermomechanical analysis of the UV-cured VSMP may be performed. Thermal analysis of the UV-cured VSMP may be carried out using model DSC 4000 by PerkinElmer (MA, USA). A small piece of the specimen (about 7.26 mg) is placed in an aluminum pan and scanned between 0-200° C. with heating and cooling rates of 10° C.·$min^{-1}$. The purging rate of the nitrogen gas is about 30 mL·$min^{-1}$. Thermomechanical test of the UV-cured VSMP specimen (6.16×18.63×1.11 mm) is conducted using model Q800 DMA (TA Instruments, DE, USA) in the multi-frequency-strain mode with 3° C.·$min^{-1}$ temperature ramp rate, 0 to 180° C. temperature scan range, 15 μm amplitude, and 1 HZ frequency.

Figure 4:
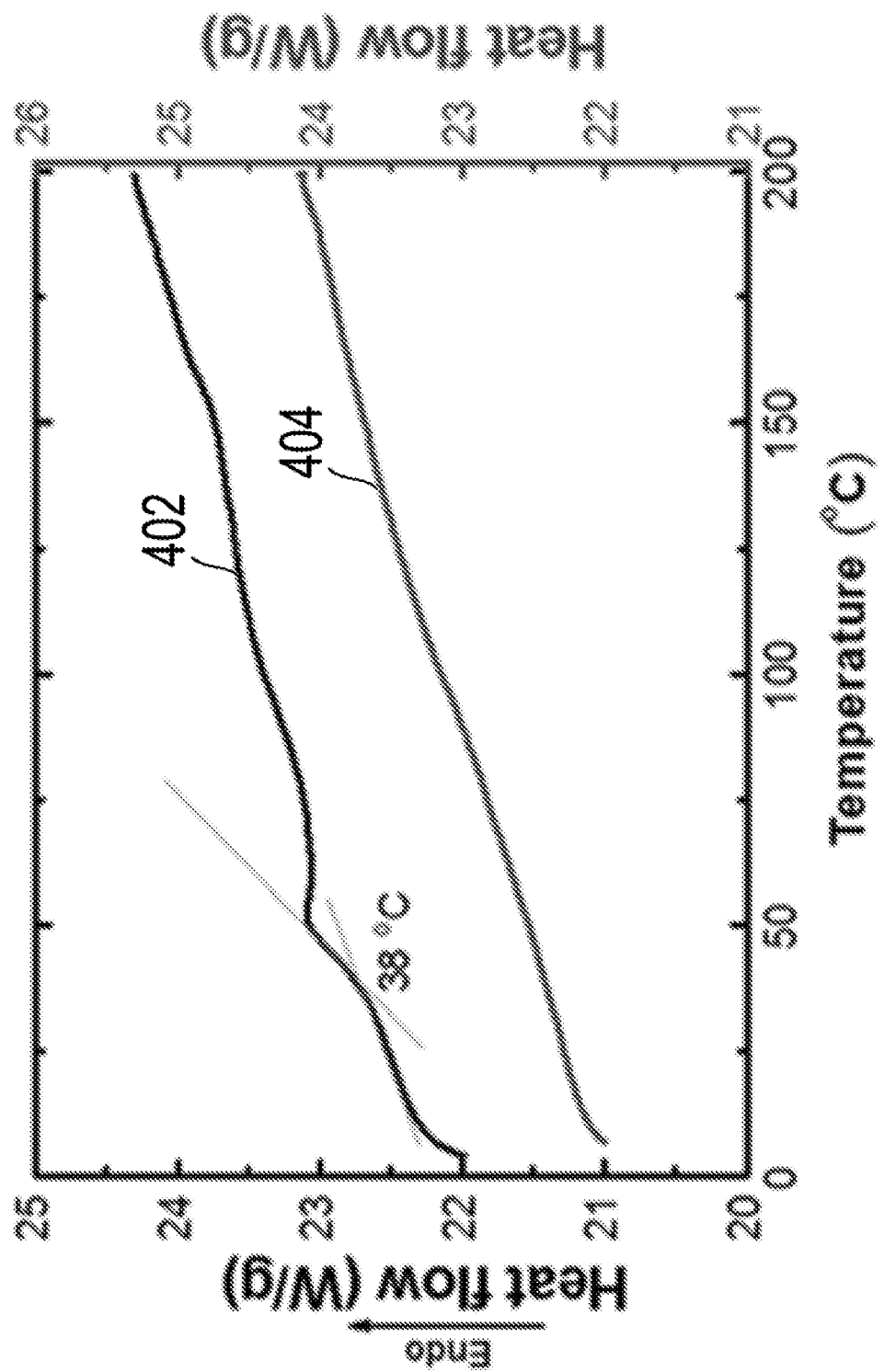
FIG. 4 illustrates example thermograms of the UV-cured thermoset VSMP.

In this example, the thermal properties and thermomechanical properties of the UV-cured VSMP are analyzed by differential scanning calorimetry (DSC) and dynamic mechanical analysis (DMA), respectively. FIG. 4 illustrates example thermograms of the UV-cured thermoset VSMP. Broad glass transition temperature ($T_g$) range starting from 38° C. is indicated by the thermogram of the first heating cycle 402. The thermogram of the second heating cycle 404 shows several small bumps implying a broad $T_g$ region as well. From the first derivative of the heat flow with respect to temperature, each bump in the second heating cycle can be identified to represent a glass transition. Therefore, the broad glass transition can also be treated as several smaller glass transition regions. The difference between the first and second thermograms may be due to the rearrangement of the polymer chain segments restricted during the curing process.

Figure 5:
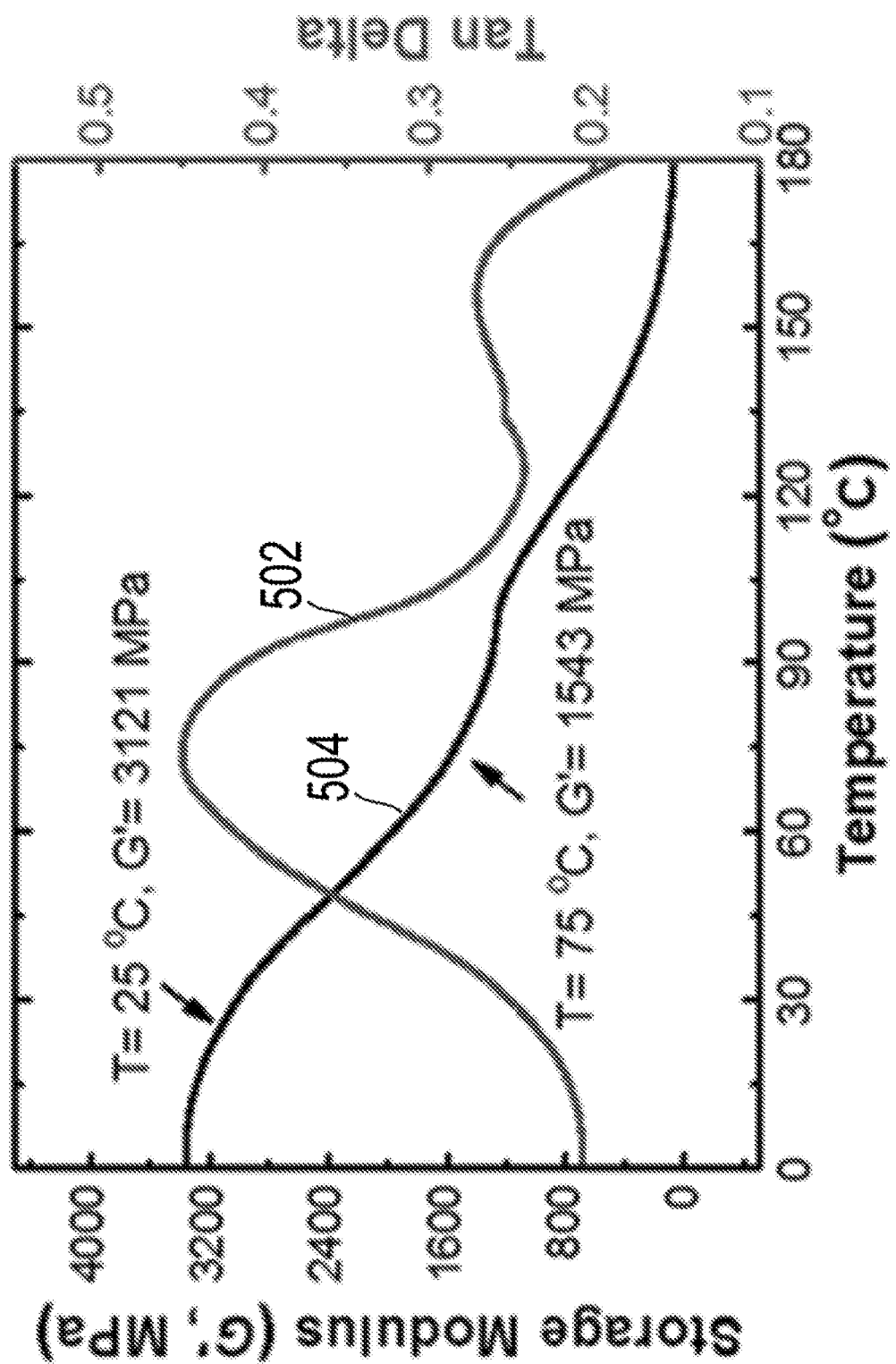
FIG. 5 illustrates an example thermomechanical analysis of the UV-cured VSMP using DMA.

The several smaller glass transition regions are further confirmed by DMA analysis, as depicted in FIG. 5. There are two peaks of the tan delta curve at about 75° C. and about 158° C. on the profile 502, respectively. In spite of the fast and complete polymerization, the cross-linking throughout the VSMP may be non-uniform due to the oxygen inhibition on the surface, resulting in the several small glass transition regions. The VSMP exhibits good thermal stability, evidenced by high stiffness in a wide temperature range, as depicted by the profile 504. It has about 3121 MPa storage modulus at room temperature and about 1543 MPa storage modulus even at its first $T_g$ temperature. Its storage modulus remains above about 1000 MPa when the temperature is as high as about 100° C.

In some embodiments, the mechanical test of the cured VSMP may be analyzed. The mechanical test may include tensile strength test and compressive strength test.

In this example, rectangular specimens (about 18.30× 54.31×1.13 mm) are prepared for the tensile strength test using the sandwich mold mentioned before. All the tensile strength tests are performed by a mechanical test system (MTS) machine (Alliance RT/5, MTS, USA) with 60 N·$min^{-1}$ loading rate at room temperature.

Figure 6:
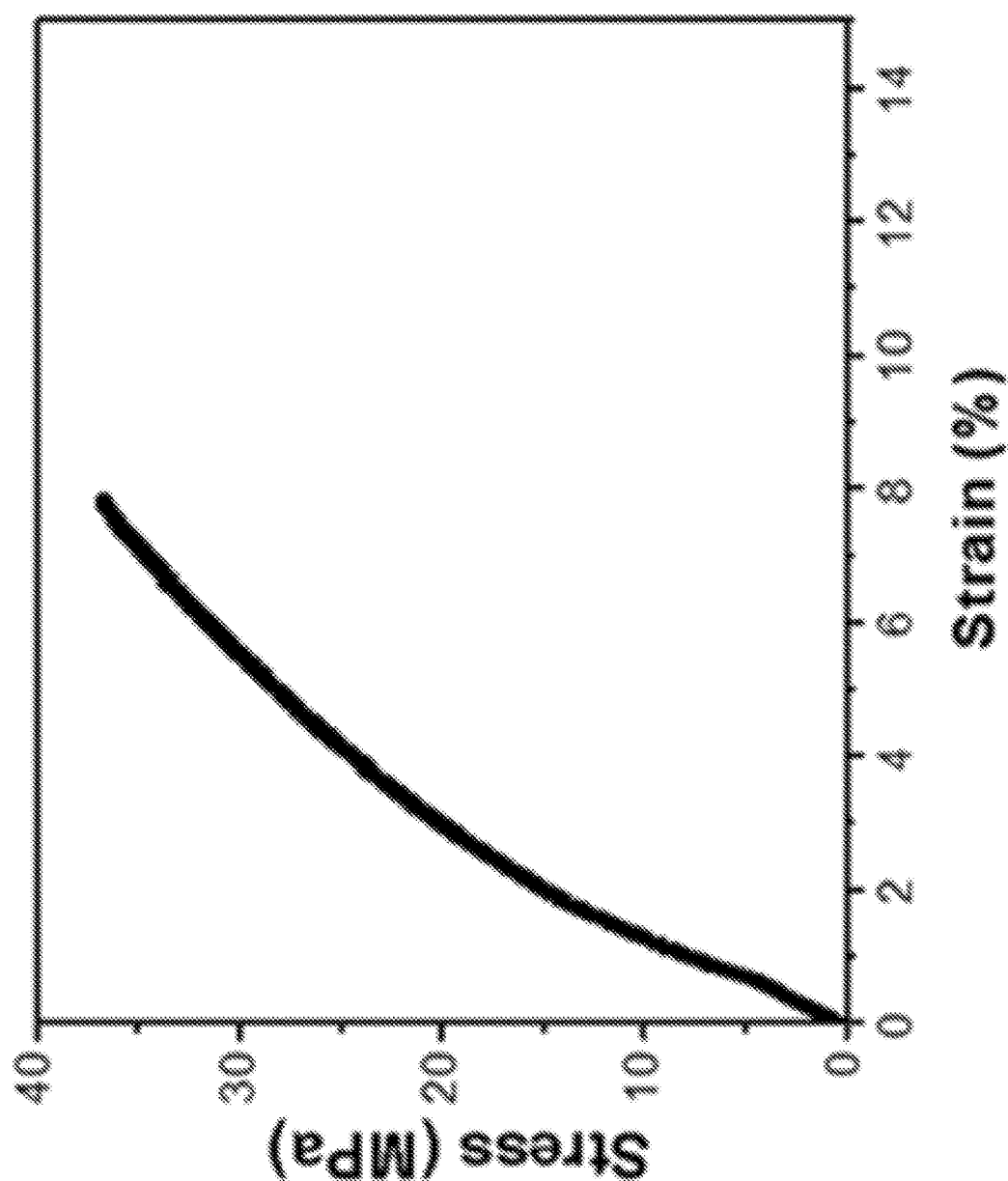
FIG. 6 illustrates a typical plot of tensile stress vs. strain of the UV-cured VSMP specimen at or after 80 s curing time.

The tensile strength of specimens with varying crosslinking degrees is investigated using a rectangular specimen (18.30×54.31×1.13 mm) (referring to profile 204 in FIG. 2). The tensile strength reaches a plateau after the crosslinking degree comes to 80%. According to a representative stress vs. strain plot of the specimen cured at 80 s, as shown in FIG. 6, there is no yielding of the material before it is broken due to the highly constrained network and high chain stiffness. The tensile strength at fracture is about 36.7 MPa and the elongation is about 8%.

Figure 7:
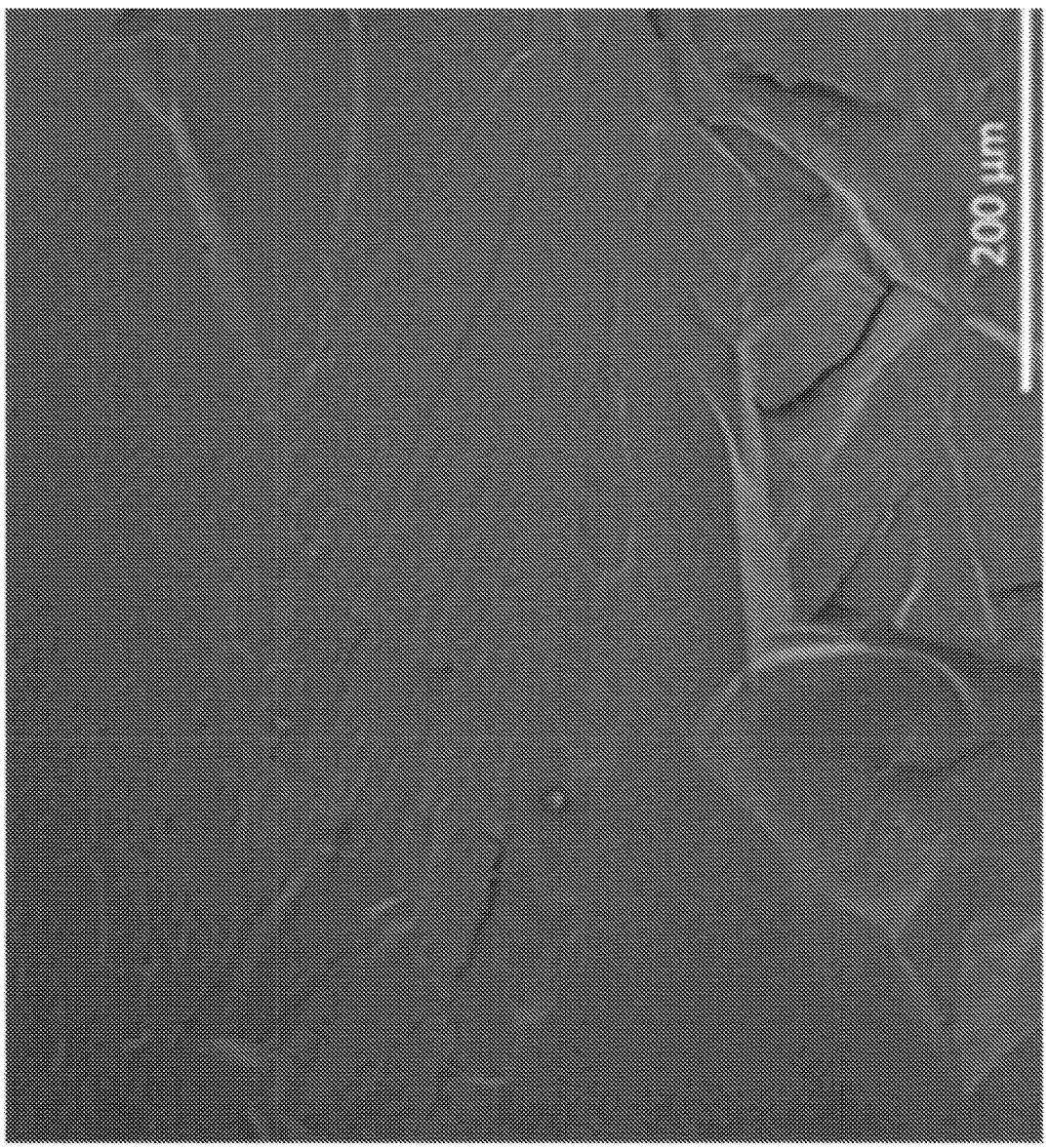
FIG. 7 illustrates an example SEM image of a facture surface of the UV-cured VSMP.

A SEM microanalysis of the fracture shows a smooth or brittle fracture surface, as illustrated in FIG. 7. The SEM microanalysis (Quanta 3D FEG, Hillsboro, Oreg., USA) is conducted to characterize the surface morphology of the fracture surface of the VSMP specimen obtained from the ultimate tensile strength test and the morphology of the ground particles for recycling. The sample surfaces are coated with platinum for approximately 6 nm. The accelerating voltage is 5 kV, and the working distance is 9 mm-9.5 mm.

Figure 8:
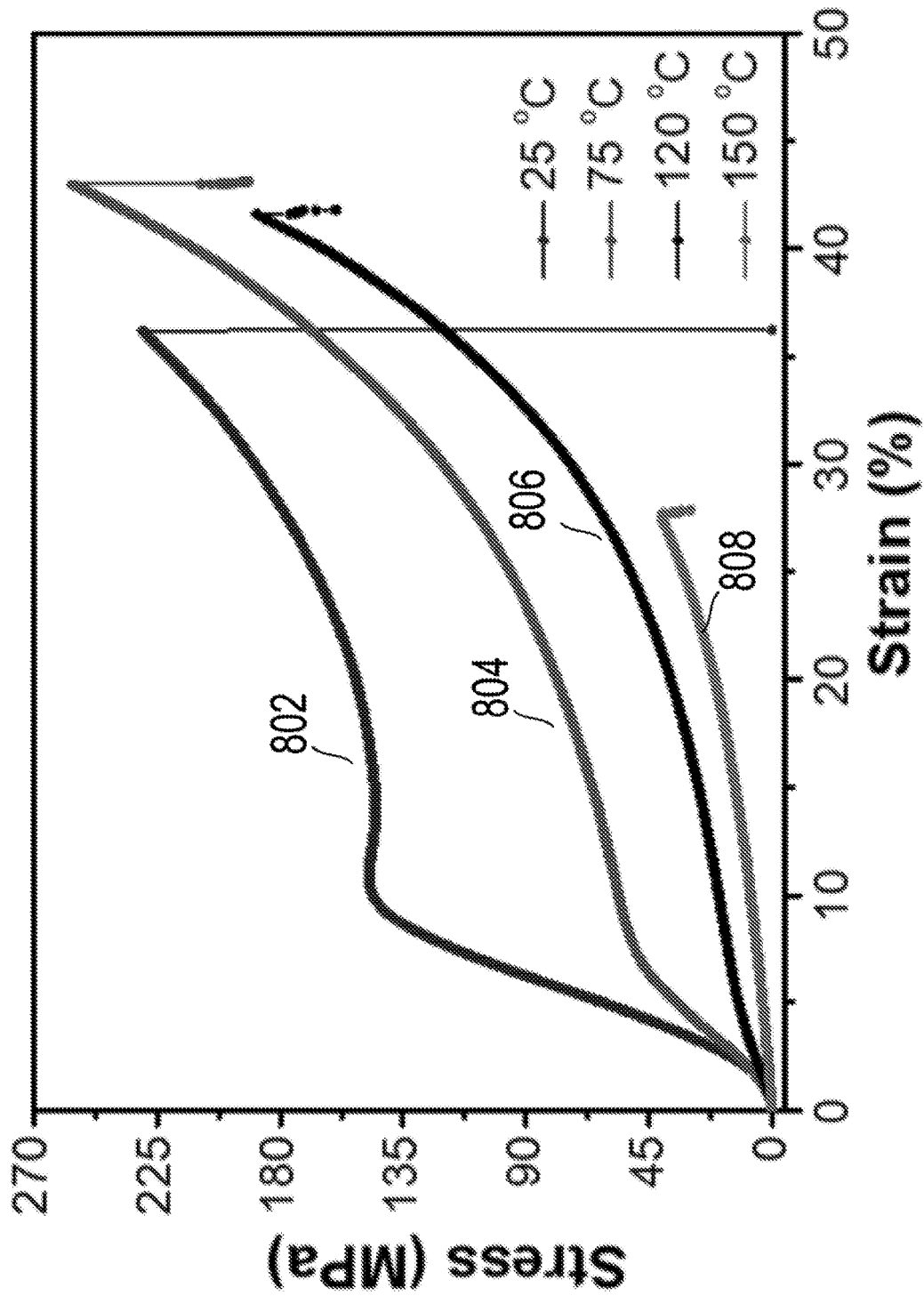
FIG. 8 illustrates an example compression behavior of the cylindrical VSMP specimens at room temperature and elevated temperatures.

In exemplary compression testing, cylindrical specimens (e.g., diameter=about 12.28 mm, height=about 19.20 mm) are prepared and used. All the compression tests are performed by a mechanical test system (MTS) machine (QTEST 150 machine, MTS, USA) with 1 mm·$min^{-1}$ loading rate. Both room temperature (25° C.) and elevated temperatures (e.g., about 75° C., about 120° C., and about 150° C.) are used to determine the compressive strength of the cured VSMP, as illustrated in FIG. 8.

However, it has been shown in previous systems that vitrimer-based epoxy thermoset may lose significant mechanical strength at elevated temperatures. Good thermal stability of VSMP is always desired for high temperature engineering applications. The compressive behavior of the VSMP at elevated temperatures is investigated with cylindrical specimens fabricated through in-situ UV-curing inside plastic syringes. The cylindrical VSMP exhibits good compressive strength (about 230 MPa) at room temperature (profile 802 in FIG. 8). Interestingly, at 75° C., the first $T_g$ point measured by tan δ, the VSMP shows better compressive strength and strain (about 256 MPa, about 43% as shown by profile 804) than at room temperature. The two smaller $T_g$ regions may be playing an important role of the increased compressive strength at 75° C. At the first $T_g$ point, part of the polymer segments may be in a rubbery state, providing more flexibility to the VSMP. Meanwhile, the large amount of the VSMP segments are still in glassy state, ensuring the high mechanical strength. Consequently, the VSMP at the first $T_g$ point behaves like a composite with higher compressive strength than at room temperature. The good thermal compressive strength (about 187 MPa as shown by profile 806) is well maintained even up to 120° C., which is higher than that of most plastics at room temperature.

In some embodiments, recycling of the cured VSMP may be investigated. In this example, the UV-cured VSMP (e.g., about 40 g) is first manually broken into small pieces and then added into the ceramic containers for the ball milling machine (Across International PQ-N2 Planetary, Livingston, N.J., USA). The broken pieces are then ground into particles through ball milling at room temperature for about 20 h. The particles are added into a steel mold, and the recycling process is carried out by applying a high pressure (from about 6 to about 14 MPa) on the steel mold at about 130° C. to about 175° C. for about 2 h. By removing the bottom of the steel mold and compressing the pushing bar, a dark brown specimen (about 4.21×4.98×59.99 mm) is obtained. Three recycling cycles in total are carried out. The specimen recycled from the previous cycle is ground into powder again via ball milling and re-molded into a specimen for the new cycle. The recycling efficiency is assessed using Equation 2:

$$\text{Recycling Efficiency} = \frac{\sigma_R}{\sigma_0} \times 100\%, \quad \text{Equation (2)}$$

where $\sigma_R$ is the tensile strength of the recycled VSMP and $\sigma_0$ is the tensile strength of the initial VSMP before recycling.

Figure 9:
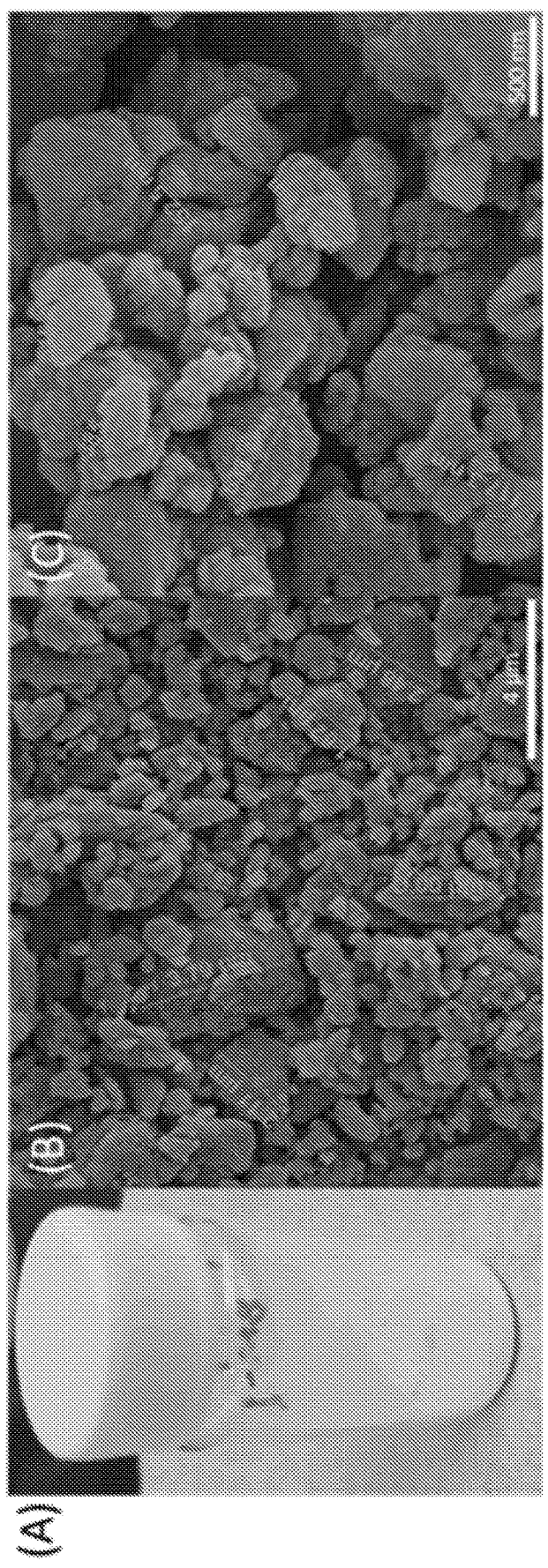
FIG. 9 illustrates: (A) a picture of the powder of the UV-cured thermoset ground by a ball milling machine, (B) a SEM micrograph of the ground powder with powder size measured, and (C) a zoom-in of the SEM micrograph of the ground powder.

Specifically, in order to investigate the recyclability of the UV-cured VSMP, the specimens cured at 80 s (40 g) are ground into white powders using a ball milling machine for about 24 hours at room temperature (FIG. 9 (A)). The morphology and size distribution of the powder particles are analyzed using SEM (FIGS. 9 (B) and (C)). It is shown that the powders are irregularly shaped particles with the size distribution ranging from about 0.5 μm to about 3.8 μm.

Figure 10:
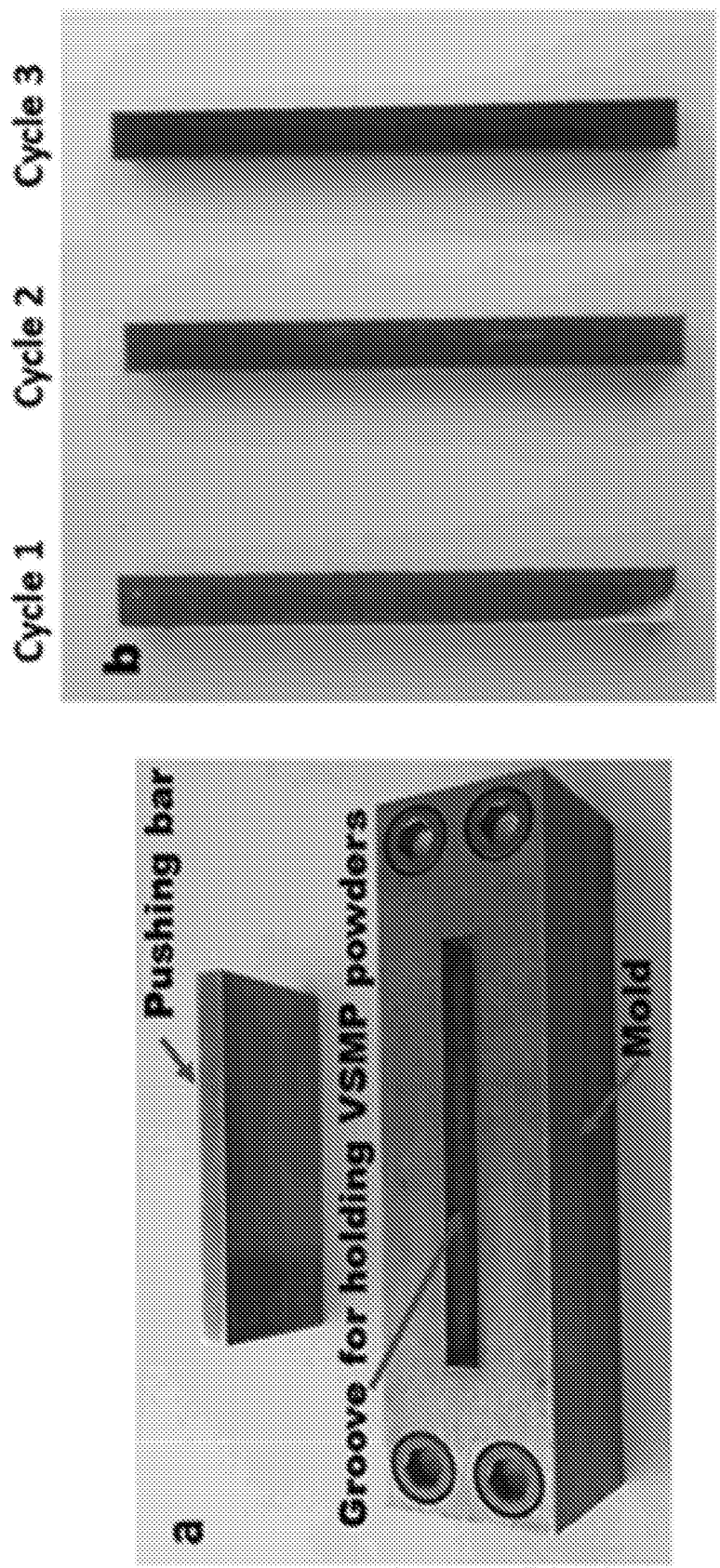
FIG. 10 illustrates: (A) a steel mold (bottom) and pushing bar (top) for preparing recycling VSMP specimens, and (B) representative pictures of the recycled thermoset specimen after the solid form recycling of the ground particles.

The ground powders are then recycled in a steel mold (FIG. 10 (A)) under a stress provided by the MTS machine at an elevated temperature (150° C.), which is around the second $T_g$. The elevated temperature enables the segment mobility of the CAN in the rubbery state, and the applied stress enhances the particle-particle contact and inter-diffusion of the polymer chains on the particle surface. The recycling process is expected to occur via transesterification reaction between the dangling hydroxyl groups and the ester bonds which can be accelerated at high temperature (referring to FIG. 1).

Figure 11:
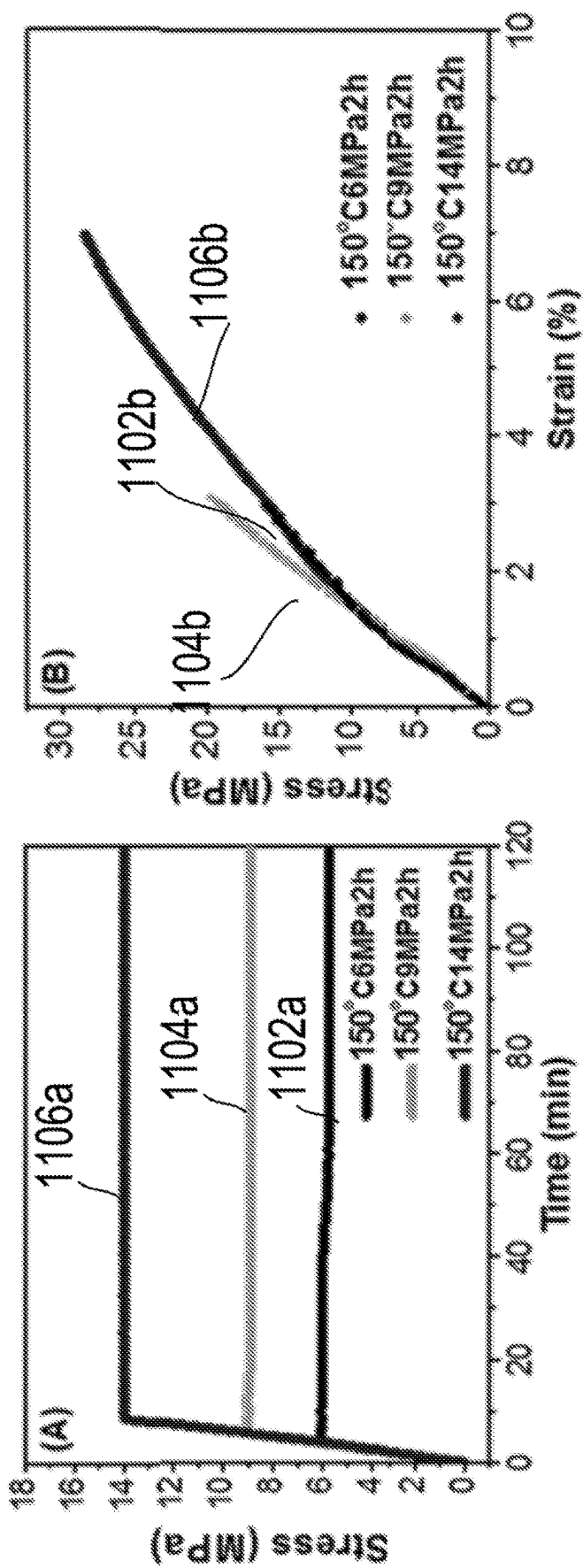
FIG. 11 illustrates: (A) representative plots of the externally applied stress on the steel mold containing the ground VSMP powders as a function of time during the recycling processes, and (B) representative plots of stress vs. strain curve of the recycled VSMPs under varying conditions.

FIG. 11 illustrates representative plots of the externally applied stress on the steel mold containing the ground VSMP powders as a function of time during the recycling processes, and representative plots of stress vs. strain curve of the recycled VSMPs under varying conditions. The plot 1102a shows the stress profile applied at 150° C., and 6 MPa for about 2 h. The plot 1104a shows the stress profile applied at 150° C., and 9 MPa for about 2 h. The plot 1106a shows the stress profile applied at 150° C., and 14 MPa for about 2 h. The plot 1102b shows the stress vs. strain curve for the condition applied at 150° C., and 6 MPa for about 2 h. The plot 1104b shows the stress vs. strain curve for the condition applied at 150° C., and 9 MPa for about 2 h. The plot 1106b shows the stress vs. strain curve for the condition applied at 150° C., and 14 MPa for about 2 h.

A systematic study of the recycling conditions on the recycling efficiency of epoxy thermoset has been reported (Lu, L.; Pan, J.; Li, G. *J. Mater. Chem. A* 2017, 5, 21505-21513), which indicates that all the three factors: applied stress, recycling temperature, and process time have effects on the recycling efficiency. With respect to the recycling time, it only makes a big difference when it is increased from 2 h to 10 h. To pursue a more efficient recycling process, all the tests in this example use the same 2 h recycling time. The effects of the applied stress and recycling temperature are investigated to find the optimal condition. Once the recycling process is done, the re-molded specimen in dark orange color (FIG. 10 (B)) is removed from the mold and its tensile strength is tested and compared to the original tensile strength to obtain the recycling efficiency (RE).

Table 1 illustrates a summary of example recycling results under various conditions.

TABLE 1

Summary of Recycling Results under Various Conditions

| Entry | Conditions[α] | Tensile Strength [MPa] | Failure Strain [%] | Recycling Efficiency [%] |
|---|---|---|---|---|
| 1 | 150° C. 6 MPa 2 h | 14.6 ± 1.3 | 3.8 ± 0.8 | 40.0 |
| 2 | 150° C. 9 MPa 2 h | 17.2 ± 2.6 | 4.4 ± 1.3 | 46.9 |
| 3 | 150° C. 14 MPa 2 h | 25.5 ± 4.0 | 9.7 ± 2.5 | 69.5 |
| 4 | 130° C. 14 MPa 2 h | 12.4 ± 0.1 | 1.7 ± 0.4 | 33.8 |
| 5 | 175° C. 14 MPa 2 h | 19.3 ± 1.0 | 3.6 ± 1.4 | 52.6 |

[α]150° C. 6 MPa 2 h means at 150° C. and under 6 MPa pressure for 2 hours.

It is shown from Table 1 that at a fixed temperature (150° C.) the RE increases from about 43.5% to about 69.5% by increasing the applied stress from 6 MPa to 14 MPa, suggesting that the inter-diffusion process of the particle surface is a crucial factor. When the recycling temperature increases from 130° C. to 150° C., the RE increases due to higher segment mobility and faster interfacial transesterification rate at 150° C. By further increasing the recycling temperature to 175° C., the RE does not increase but decreases by 14%. This may be due to a competing aging process of the VSMP at an elevated temperature. Therefore, entry 3 (Table 1) shows the optimal recycling condition for this VSMP.

Table 2 illustrates an example summary of mechanical properties and recycling efficiency after each recycling cycle.

TABLE 2

Summary of Mechanical Properties and Recycling Efficiency after Each Recycling Cycle.

| Cycle | Tensile strength [MPa] | Failure Strain [%] | Recycling Efficiency [%] |
|---|---|---|---|
| 1 | 25.5 ± 4.0 | 9.7 ± 2.5 | 69.5 |
| 2 | 22.8 ± 0.5 | 5.9 ± 1.0 | 62.1 |
| 3 | 9.3 ± 3.8 | 6.9 ± 4.3 | 25.3 |

Figure 12:
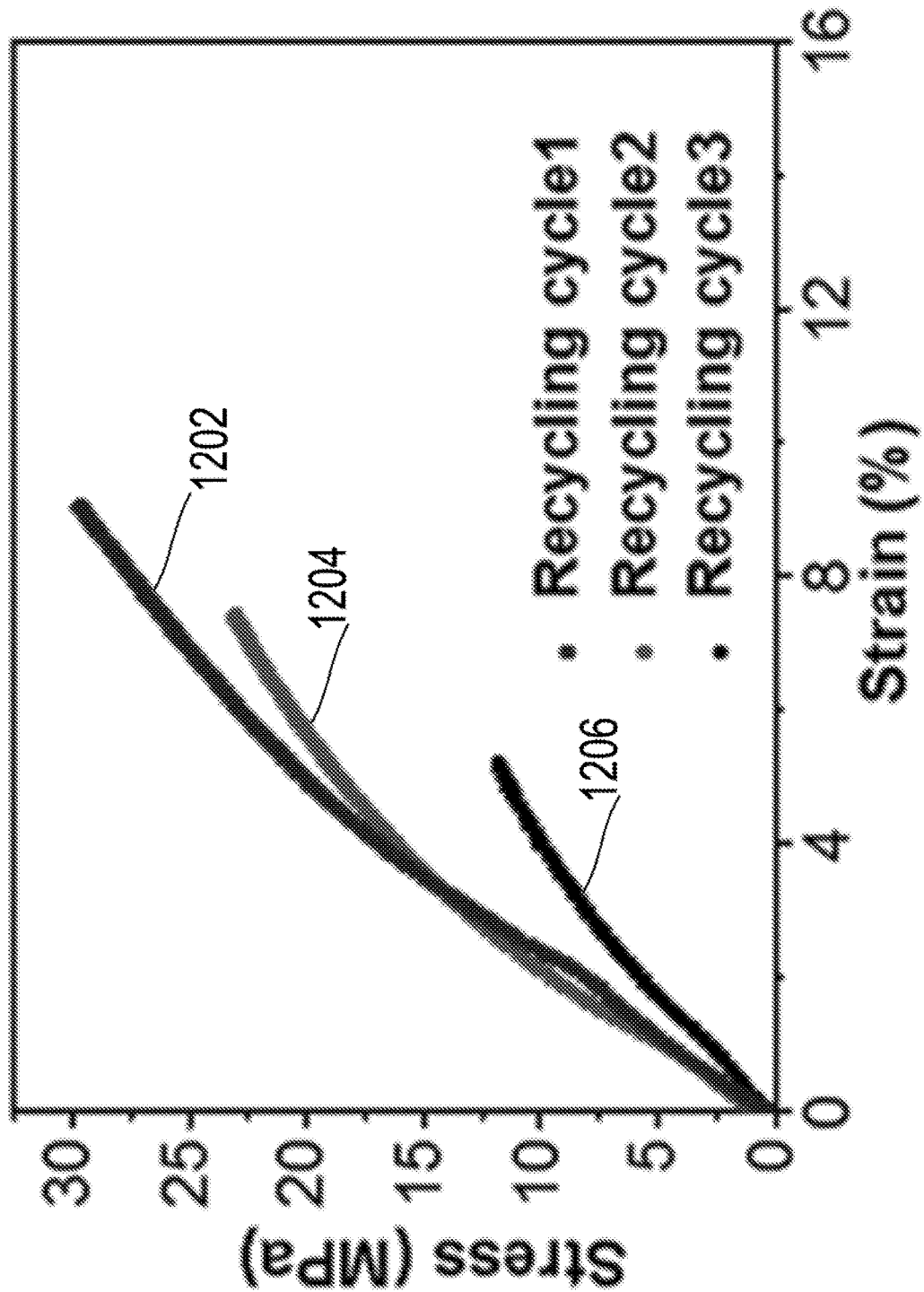
FIG. 12 illustrates representative plots of stress vs. strain of the specimens obtained from three recycling cycles, respectively.

Under the optimal recycling condition, the recyclability is assessed by extending the number of recycling cycles. The mechanical strength of the recycled specimen is investigated by conducting tensile strength test, as shown in FIG. 12 where representative plots of stress vs. strain of the specimens obtained from the first, second and third recycling cycles are illustrated in plots 1202, 1204 and 1206, respectively. The RE is calculated based on the same equation. For the first two recycling cycles as shown in Table 2, the RE remain above 60%. The specimen obtained from the second recycling cycle has the same appearance as the specimen obtained from the first recycling cycle (referring to FIG. 10 (B)). However, the specimen obtained from the third recycling cycle has much darker color than the first two (referring to FIG. 10 (B)), and its RE has a considerable decrease to only 25.3%, indicating that the VSMP can be effectively recycled and reused twice with more than 60% tensile strength of the original VSMP (Table 2). With 62% RE, the tensile strength is about 23 MPa, which is comparable to the commercial high impact polystyrene.

The recycling of the VSMP is not limited to solid state recycling; recycling by solvent is another alternative (Xu, P.; Li, J.; Ding, J. Chemical recycling of carbon fibre/epoxy composites in a mixed solution of peroxide hydrogen and N,N-dimethylformamide. Composites Science and Technology, 82: 54-59, (2013); Shi, Q.; Yu, K.; Dunn, M. L.; Wang, T.; Qi, H. J. Solvent Assisted Pressure-Free Surface Welding and Reprocessing of Malleable Epoxy Polymers. Macromolecules, 49: 5527-5537, (2016).). Various solvents may be used to dissolve the VSMP, for example, ethylene glycol; propylene glycol; 1,3-butanediol; diethylene glycol; 2-ethylhexanol; cyclohexanol; benzyl alcohol; dimethyl sulfoxide; n-methyl-2-pyrrolidone; etc. It is also possible that multiple solvents (or a mixture of solvents) can be used to shorten the recycling time and enhance the recycling efficiency, such as a solvent (for example N-Methyl-2-pyrrolidone) for swelling the polymer and a catalyst (for example 1,5,7-triazabicyclo[4,4,0]dec-5-ene) for breaking the dynamic covalent bonds. The recycled oligomer may be reused for 3D/4D printing so that a polymer can be printed more than one time.

In some embodiment, shape memory effect and recovery stress of the cured VSMP may be provided. To test the shape memory effect, a cylindrical specimen made of BPAGMA (diameter=12.27 mm, height=19.20 mm) is fabricated by under UV irradiation (61 mW·cm$^{-2}$) for about 14 min. The cylindrical specimen undergoes a hot programming process. It is placed into the MTS machine with the temperature increased to 150° C., and the whole system stays isothermal for about 1 h to reach equilibrium. The compression programming starts with compression at a rate of 0.25 mm·min$^{-1}$ until 24% strain, followed by cooling down the whole MTS system to room temperature while holding the stress constant. After unloading at room temperature, the compression programming process is completed. Free shape recovery is conducted by heating the programmed VSMP to 150° C. without any load and staying isothermal for about 15 min. Shape fixity ratio (F) and shape recovery ratio (R) are calculated using Equation 3 and Equation 4, respectively:

$$F = \frac{\varepsilon_f}{\varepsilon_l} \times 100\% \quad \text{Equation (3)}$$

$$R = \frac{\varepsilon_f - \varepsilon_r}{\varepsilon_f} \times 100\% \quad \text{Equation (4)}$$

where $\varepsilon_l$ is the measured strain before load removal, $\varepsilon_f$ is the fixed strain after load removal, and $\varepsilon_r$ is the residual strain after recovery.

To measure the recovery stress, the programmed cylinder is fully constrained by the fixtures of the MTS machine in a pre-heated oven (150° C., 1 h) so that the thermal expansion of the metal fixtures can be avoided. Once the cylindrical specimen is confined, the data collection starts to record the stress as a function of time. The relationship between the recovery stress and recovery strain is also investigated. When the recovery stress in the fully constrained recovery stress test is stabilized, about 1.33% of recovery strain is allowed to occur by retreating the test fixture, and the recovery stress reduces until stabilization. The next step repeats the same procedure of the previous step until the recovery stress became zero. The energy output is calculated based on the area under the curve of recovery stress and recovery strain.

Figure 13:
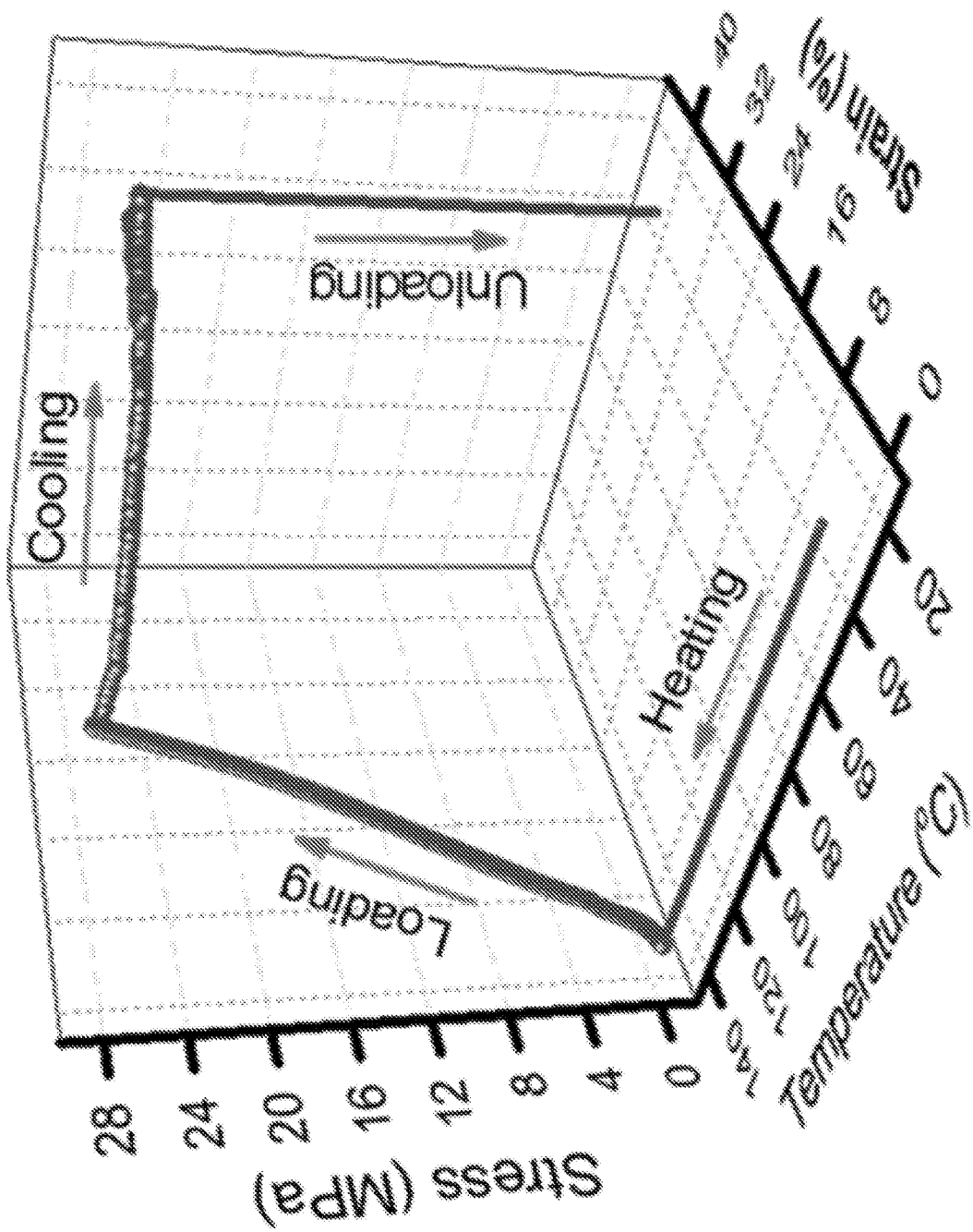
FIG. 13 illustrates a representative 4-step programming profile of the UV-cured VSMP at 150° C. with 0.25 mm·min-1 compression rate.

In this example, shape recovery ratio and recovery stress of the UV-cured VSMP are tested by following two 5-step procedures, respectively. The first four steps for the two procedures are the same: 1) heating up the system, 2) loading at rubbery temperature, 3) cooling to glassy state while holding the stress constant, and 4) unloading, as shown in FIG. 13 where a representative 4-step programming profile of the UV-cured VSMP at 150° C. with 0.25 mm·min$^{-1}$ compression rate is shown.

To briefly introduce this process, a small cylinder (diameter 12.27 mm and height 19.20 mm) made of the UV-cured VSMP is compressed by the MTS machine at 150° C. in an oven which is pre-heated for 1 h. The cooling step starts right after the loading step to freeze the mobility of the chain segments of the VSMP) so that the temporary deformation can be fixed. It is shown that about 27 MPa is needed to compress the cylinder at 150° C. for 24% strain. The stress is maintained the same at 0 N·min$^{-1}$ loading rate during the cooling process, and became zero after removing the external load at room temperature, which is the 4th step—unloading (FIG. 13). Shape fixity ratio (F) is obtained by comparing the height of the specimen after unloading to the height of the cooled specimen under load (Equation 3). Free shape recovery is achieved by placing a programmed specimen in the MTS oven and then increasing the temperature from room temperature to 150° C. Shape recovery ratio (R) is obtained by Equation 4. Table 3 gives the F and R obtained for at least four shape recovery cycles.

TABLE 3

Summary of Shape Fixity Ratio and Shape Recovery Ratio after Multiple Shape Recovery Cycles.

| Recovery cycle | 1 | 2 | 3 | 4 |
|---|---|---|---|---|
| Shape Fixity Ratio (F) [%] | 100 | 94.3 | 98.1 | 93.2 |
| Shape Recovery Ratio (R) [%] | 99.0 | 100 | 100 | 96.9 |

Figure 14:
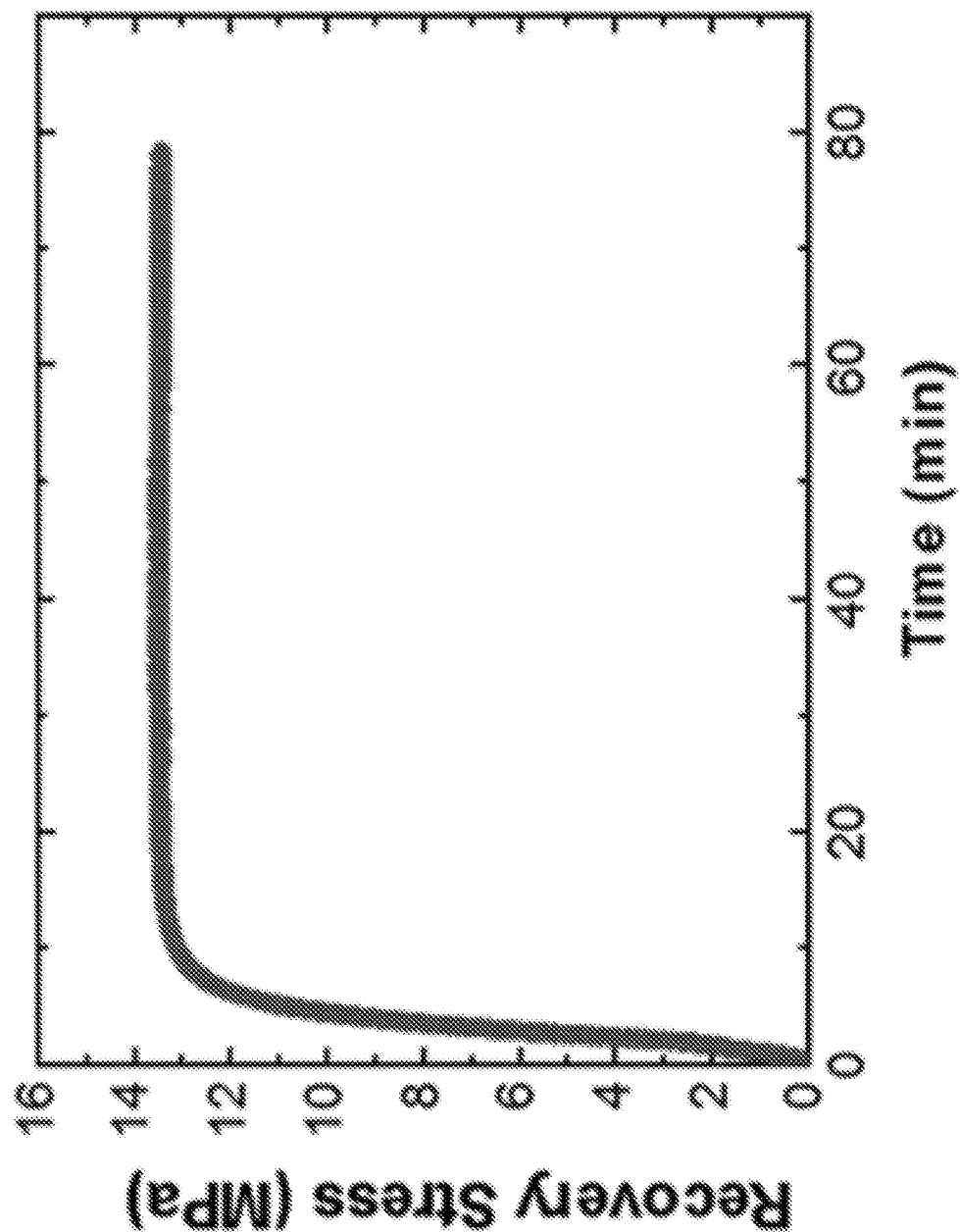
FIG. 14 illustrates a representative profile of recovery stress vs. times measured by fully confining a cylindrical specimen (diameter=12.28 mm, height=19.20 mm)

To avoid the effect of thermal expansion of the MTS fixtures on the shape recovery stress, the MTS system is pre-heated at 150° C. for 1 h. The recovery stress is measured by confining a programmed cylinder (diameter 13.87 mm and height 15.39 mm) using the MTS fixtures. The maximum recovery stress is first recorded with zero recovery strain (referring to FIG. 14). The programmed cylinder exhibits a rapid stress recovery which takes only 4 min to reach about 9.4 MPa recovery stress and 9 min to reach a large recovery stress of about 13 MPa. The recovery stress eventually stabilizes at about 13.4 MPa after about 16 min and remains constant for more than 1 h.

Figure 15:
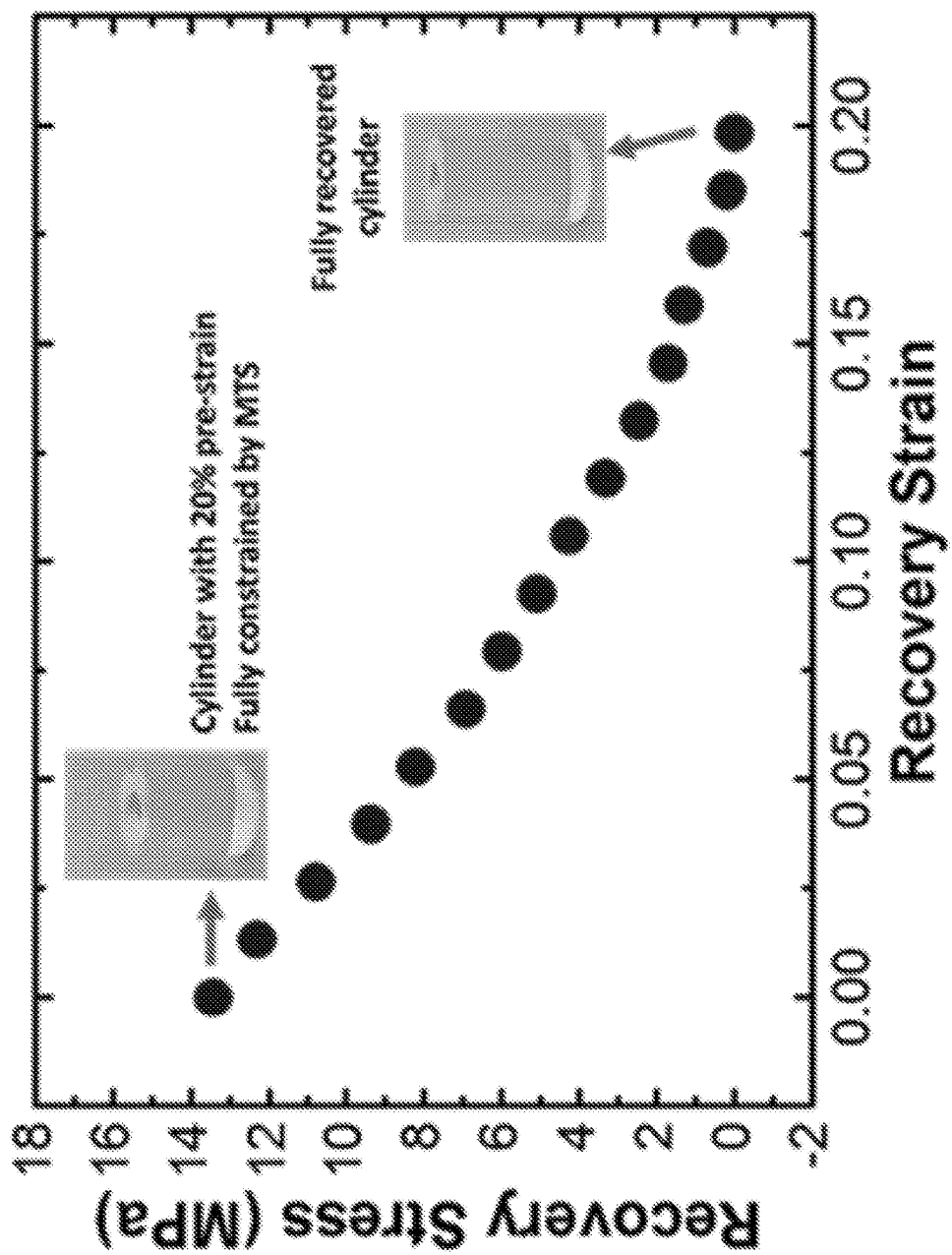
FIG. 15 illustrates a profile of the recovery stress vs. recovery strain which is measured by the MTS machine at 150° C. using the programmed VSMP cylinder (diameter 13.87 mm and height 15.39 mm)

The relationship between recovery stress and recovery strain is then investigated. It is shown that the recovery stress decreases as the recovery strain increases, as shown in FIG. 15 which shows a profile of the recovery stress vs. recovery strain which is measured by the MTS machine at 150° C. using the programmed VSMP cylinder (diameter 13.87 mm and height 15.39 mm). The programmed cylinder is able to produce a large and stabilized recovery stress (more than 6 MPa) with 8% recovery strain. Moderate recovery stress (3 to 5 MPa) can be produced and maintained with 8% to 12% recovery strain. The study of recovery stress as a function of recovery strain shows that the VSMP can output a large and stable stress in the real world working conditions. The energy output of the UV-cured VSMP is calculated based on the area under the curve of recovery stress vs. recovery strain, showing that 1.05 MJ·m$^3$ energy output can be produced throughout the whole stress recovery process.

Normally epoxy-based SMPs which usually produce low to moderate recovery stress (less than 4 MPa) require a curing agent to connect the hard epoxy segments. In contrast, the UV-cured VSMP of the invention is fabricated through only radical polymerization without any curing agent, and the BPAGMA hard segment can be directly connected to each other and produce a highly constrained network, leading to the large recovery stress and energy output.

In some embodiments, a formula of 4D printing ink may be developed based on BPAGMA also including 2-Hydroxy-2-methylpropiophenone (3.5 wt %), Bis(2,4,6-trimethylbenzoyl)-phenylphosphineoxide (1 wt %), triethylamine (0.5 wt %), and isopropanol (or methanol, ethanol, n-propanol, n-butanol, isobutanol, pentanol) (25 wt %). The IPA amount can be from about 3 wt % to about 50 wt % with about 18 wt % as an exemplary amount.

In some embodiments, a formula of 4D printing ink may be developed based on BPAGMA (Bisphenol A ethoxylate diacrylate/dimethacrylate) with all possible molecular weight, Bisphenol F ethoxylate (2 EO/phenol) diacrylate/dimethacrylate with all possible molecular weight, Bisphenol A glycerolate (1 glycerol/phenol) diacrylate, Bisphenol A dimethacrylate, 1,4-Phenylene dimethacrylate. Photoinitiators may include 2-Hydroxy-2-methylpropiophenone (3.5 wt %) Bis(2,4,6-trimethylbenzoyl)-phenylphosphineoxide (1 wt %), triethylamine (0.5 wt %). Other monomers may include 1,4-Butanediol dimethacrylate/diacrylate (or 1,3-Butanediol diacrylate/dimethacrylate, 1,6-Hexanediol dimethacrylate/diacrylate, 1,6-Hexanediol ethoxylate diacrylate/dimethacrylate, Trimethylolpropane triacrylate/trimethacrylate, Trimethylolpropane propoxylate triacrylate/trimethacrylate, Trimethylolpropane trimethacrylate/triacrylate, Trimethylolpropane ethoxylate triacrylate/trimethacrylate, Pentaerythritol tetraacrylate/tetramethacrylate, Dipentaerythritol penta-/hexa-acrylate/methacrylate, Glycerol propoxylate (1PO/OH) triacrylate/trimethacrylate, Di(trimethylolpropane) tetraacrylate/tetramethacrylate, Isobornyl acrylate/methacrylate, Di(ethylene glycol) diacrylate/dimethacrylate, Neopentyl glycol diacrylate/dimethacrylate, Ethylene glycol diacrylate/dimethacrylate, Pentaerythritol diacrylate/dimethacrylate monostearate, Glycerol 1,3-diglycerolate diacrylate/dimethacrylate, Triethylene glycol dimethacrylate/diacrylate, 1,8-octanediol dimethacrylate/diacrylate, 1,10-decanediol dimethacrylate/diacrylate, 1,12-dodecanediol dimethacrylate/diacrylate) (5-80 wt %, with an exemplary amount at 20 wt %).

In some embodiments, photoinitiator systems may include 2-Hydroxy-2-methylpropiophenone (Darocur 1173) (1-Hydroxycyclohexyl phenyl ketone (Irgacure 184), 1-Hydroxycyclohexyl phenyl ketone+benzophenone (ratio from 99 wt %:1 wt % to 1 wt % to 99 wt %), 2-Hydroxy-4'-(2-hydroxyethoxy)-2-methylpropiophenone (Irgacure 2959), Methylbenzoylformate (Darocur MBF), 2-[2-(2-oxo-2-phenylacety)poxyethoxy]ethyl 2-oxo-2-phenylacetate (Irgacure 754), 2,2-Dimethoxy-2-phenylacetophenone (Irgacure 651), 2-Benzyl-2-(dimethylamino)-4'-morpholinobutyrophenone (Irgacure 369), 2-Methyl-4'-(methylthio)-2-morpholinopropiophenone (Irgacure 907), Irgacure 1300, 2-Hydroxy-1-{4-[4-(2-hydroxy-2-methyl-propionyl)-benzyl]-phenyl}-2-methyl-propan-1-one (Irgacure 127), Irgacure 4265, (4-Methylphenyl) [4-(2-methylpropyl)phenyl] iodonium hexafluorophosphate, Irgacure 250, Irgacure 2022, Irgacure 500, benzophenone, Acetophenone, Anisoin, Anthraquinone, Anthraquinone-2-sulfonic acid, sodium salt monohydrate, (Benzene) tricarbonylchromium, Benzil, Benzoin, Benzoin ethyl ether, Benzoin isobutyl ether, Benzoin methyl ether, Benzophenone/1-Hydroxycyclohexyl phenyl ketone, 3,3',4,4'-Benzophenonetetracarboxylic dianhydride, 4-Benzoylbiphenyl, 2-Benzyl-2-(dimethylamino)-4'-morpholinobutyrophenone, 4,4'-Bis(diethylamino)benzophenone, 4,4'-Bis(dimethylamino)benzophenone, Camphorquinone, 2-Chlorothioxanthen-9-one, (Cumene) cyclopentadienyliron(II) hexafluorophosphate, Dibenzosuberenone, 2,2-Diethoxyacetophenone, 4,4'-Dihydroxybenzophenone, 4-(Dimethylamino)benzophenone, 4,4'-Dimethylbenzil, 2,5-Dimethylbenzophenone, 3,4-Dimethylbenzophenone, Diphenyl(2,4,6 trimethylbenzoyl) phosphine oxide 2-Hydroxy-2-methylpropiophenone, 4'-Ethoxyacetophenone, Ethylanthraquinone, Ferrocene, 3'-Hydroxyacetophenone, 4'-Hydroxyacetophenone, 3-Hydroxybenzophenone, 4-Hydroxybenzophenone, 2-Methylbenzophenone, 3-Methylbenzophenone, Methylbenzoylformate, 2-Methyl-4'-(methylthio)-2-morpholinopropiophenone, Phenanthrenequinone, 4'-Phenoxyacetophenone, Thioxanthen-9-one, Triarylsulfonium hexafluoroantimonate salts, Isopropyl thioxanthone, 2-ethylhexyl-(4-N,N-dimethyl amino)benzoate, Ethyl-4-(dimethylamino)benzoate, camphorquinone) with one or multiple of them (with each amount from 0 wt % to 30 wt % and 3.5 wt % as exemplary); Bis(2,4,6-trimethylbenzoyl)-phenylphosphineoxide (Irgacure 819) (2,2-Dimethoxy-2-phenylacetophenone, Diphenyl(2,4,6-trimethylbenzoyl)phosphine oxide (Darocur TPO), Diphenyl(2,4,6- trimethylbenzoyl)phosphine oxide+2-Hydroxy-2-methylpropiophenone (ratio from 99 wt %:1 wt % to 1 wt % to 99 wt %), Bis(2,4,6-trimethylbenzoyl)-phenylphosphineoxide dispersed in water (from 0.1 wt % to 99.9 wt %), Bis(2,4,6-trimethylbenzoyl)-phenylphosphineoxide+2-Hydroxy-2-methylpropiophenone (ratio from 99 wt %:1 wt % to 1 wt % to 99 wt %), Bis(.eta.5-2,4-cylcopentadien-1-yl)-bis(2,6-difluoro-3-(1H-pyrrol-1-yl)-phenyl) titanium (Irgacure 784), Irgacure 2100) with one or multiple of them. (0 wt % to 30 wt % with 1.5 wt % as an exemplaryamount); triethylamine (N,N,N',N'',N''-Pentamethyldiethylenetriamine, trimethylamine, N,N,N-Trimethyl-1,3-propanediamine, N,N,N'-Triethylethylenediamine, N,N,N'-Trimethyl-1,3-propanediamine, N,N,N'-Triethylethylenediamine, N,N-Diethyl-N'-methylethylenediamine, N,N-Dimethyl-N'-ethyl ethylenediamine, N,N'-Dimethylethylenediamine, N,N,N'-Trimethylethylenediamine, polymer-bound, N,N-Dimethylethylenediamine, N,N,N',N'-Tetramethyl-1,3-propanediamine, N,N-Dimethyl-1,3-propanediamine, 4-(Diethylamino)benzoic acid, 1-[Bis[3-(dimethylamino) propyl]amino]-2-propanol, 1,6-Diaminohexane-N,N,N',N'-tetraacetic acid, 2-[2-(Dimethylamino)ethoxy]ethanol, N,N,N',N'-Tetramethyl-1,4-butanediamine, N,N,N',N'-Tetramethyl-2-butene-1,4-diamine, N,N,N',N'-Tetramethyl-1,6-hexanediamine, 1,4,8,11-Tetramethyl-1,4,8,11-tetraazacyclotetradecane, 1,3,5-Trimethylhexahydro-1,3,5-triazine, triallylamine, Diallylmethylamine, Diallylamine, N,N-Dimethylallylamine, Tripropylamine, 5-Aminopyrimidine, N-Allylmethylamine, Tributylamine, Tripentylamine, Trihexylamine, Triisobutylamine, Triisopropylamine, 2-(Dibutylamino)ethanol, Dipropylamine, 2-(Diisopropylamino)ethanol, N-Butyldiethanolamine, 2-(Butylamino) ethanol, 2-(dioctylamino)-ethanol, N-tert-Butyldiethanolamine, N-Ethyldiethanolamine, 4-Aminopyrimidine, 2-Aminopyrimidine, 3-Aminopyridazine, Aminopyrazine, 2-Amino-5-nitropyrimidine, 5-(Tributylstannyl)pyrimidine, 4-Aminopyrimidine-5-carboxaldehyde, 4-Aminopyridazine, 1,1,3,3-Tetramethylguanidine, 1,8-Diazabicyclo (5.4.0)undec-7-ene, 7-Methyl-1,5,7-triazabicyclo[4.4.0]dec-5-ene, 1,5,7-Triazabicyclo[4.4.0], 1,5-Diazabicyclo(4.3.0) non-5-ene) with one or multiple of them (with each amount from 0 wt % to 30 wt % and 0.5 wt % as exemplary); Sudan I (Orange G) (0 wt % to 10 wt %); Bis(4-tert-butylphenyl) iodonium perfluoro-1-butanesulfonate (Bis(4-tert-butylphenyl)iodonium p-toluenesulfonate, Bis(4-tert-butylphenyl)iodonium triflate, Boc-methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium p-toluenesulfonate, Diphenyliodonium triflate, (4-Fluorophenyl)diphenylsulfonium triflate, N-Hydroxynaphthalimide triflate, (4-Iodophenyl)diphenylsulfonium triflate, (4-Methoxyphenyl)diphenylsulfonium triflate, 2-(4-Methoxystyryl)-4,6-bis(trichloromethyl)-1,3,5-triazine, (4-Methylthiophenyl)methyl phenyl sulfonium triflate, 1-Naphthyl diphenylsulfonium triflate, (4-Phenoxyphenyl)diphenylsulfonium triflate, (4-Phenylthiophenyl)diphenylsulfonium triflate, Triarylsulfonium hexafluoroantimonate salts, mixed 50 wt. % in propylene carbonate, Triarylsulfonium hexafluorophosphate salts, Triphenylsulfonium perfluoro-1-butanesufonate, Triphenylsulfonium triflate, Tris(4-tert-butylphenyl)sulfonium perfluoro-1-butanesulfonate, Tris(4-tert-butylphenyl)sulfonium triflate) with one or multiple of them (with each amount from 0 wt % to 30 wt %).

The polymer can also be strengthened by fillers such as $TiO_2$, ($ZnO$, $SiO_2$, $Au$, $Ag$, $Fe_3O_4$) fillers and nanoparticles (0 wt % to 30 wt %); carbon black (fiber glass, carbon nanotubes, carbon fibers) (0 wt % to 50 wt %).

Figure 16:
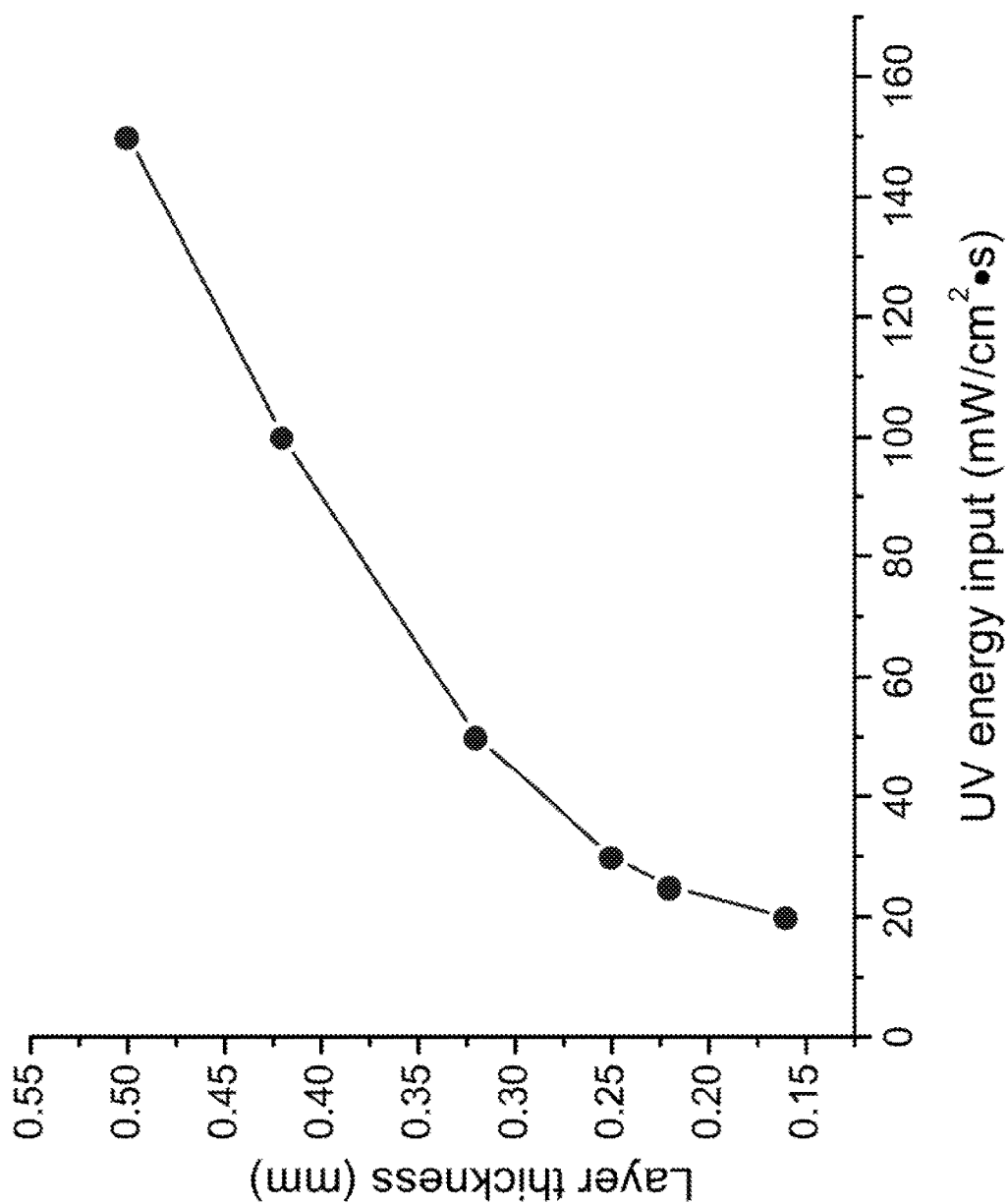
FIG. 16 illustrates a profile of resin layer thickness upon the energy input of the UV light source.

In some embodiments, calibration of layer thickness vs. UV energy input may be performed. To enable the 3D printing of the resin (e.g., 4D inks) via stereolithrography (SLA) or direct light printing (DLP), the relationship between the thickness of the cured resin and the UV energy input may be calibrated with which the resolution of the printed object at Z-axis can be effectively controlled. Based on a formulation, an example calibration curve is established in FIG. 16 and used as a guidance for the subsequent 3D printing.

In some embodiments, a 3D Printing-stereolithography (SLA) process may be provided by using the above inks. The 3D printing process can be conducted by a commercial SLA 3D printer (Asiga, Pico 2 39 UV, 385 nm, 34 mW/cm²) with an open resin system. The 3D printable resin/ink is added into a resin tray coming with the 3D printer. The designed 3D structure using Solidworks is imported into the software for the 3D printer (e.g., Composer). The edited structure is sent to the printer, and the 3D structure is printed via UV-curing of layer-by-layer using the 3D printable resin.

Figure 17:
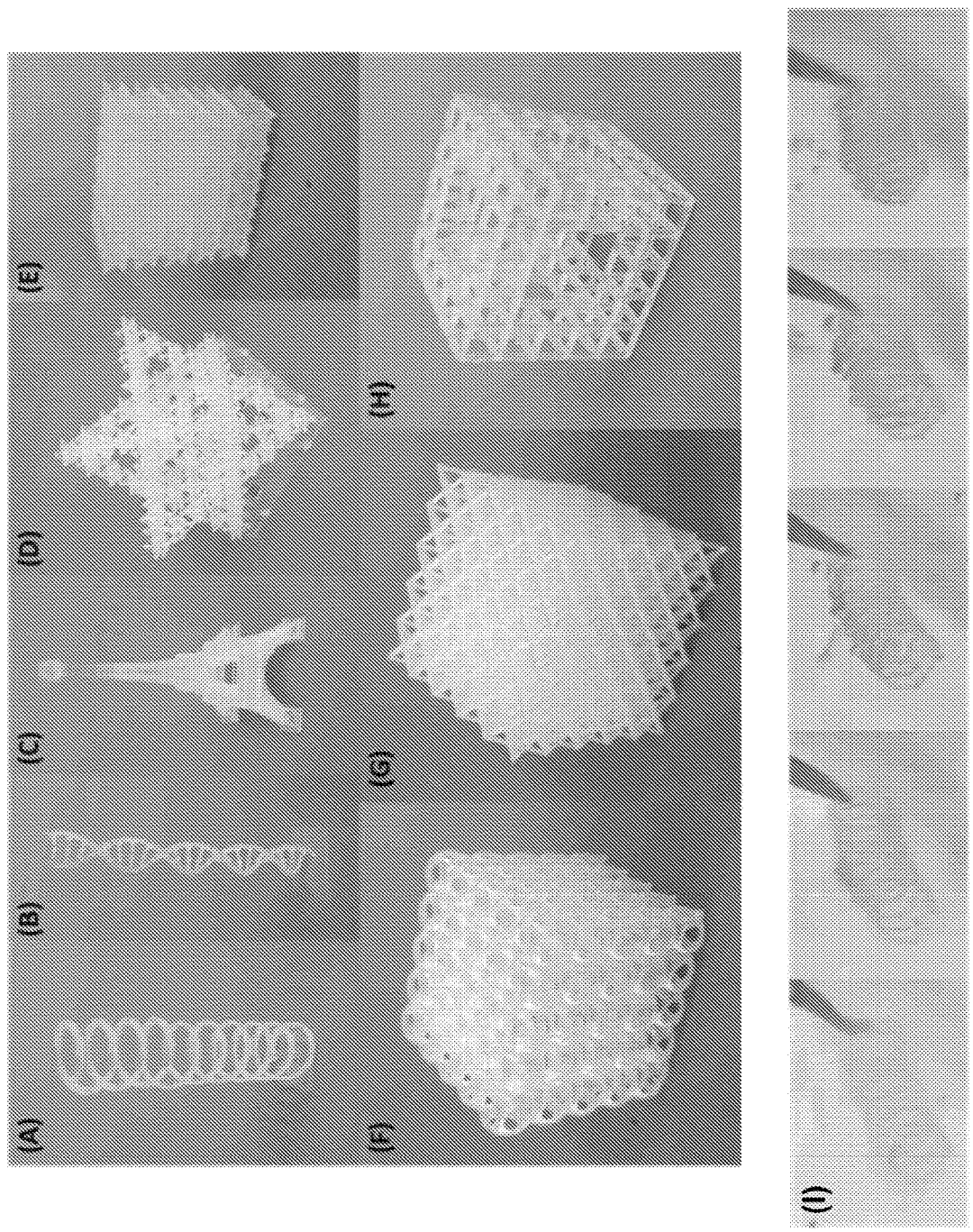
FIG. 17 shows various complex structures printed out using the 3D printable resin.

FIG. 17 shows various complex structures printed out using the 3D printable resin. For example, the various shapes made of 3D printable resin may include helical structures (A) and (B); the Eiffel Tower (C); 2-order self-similar octet structure (D); auxetic structure (E); foam lattice (F); octet lattice (G); 2-order square lattice (H); and a programmed spring recovers to its original length in a boiled water bath (I).

Figure 18:
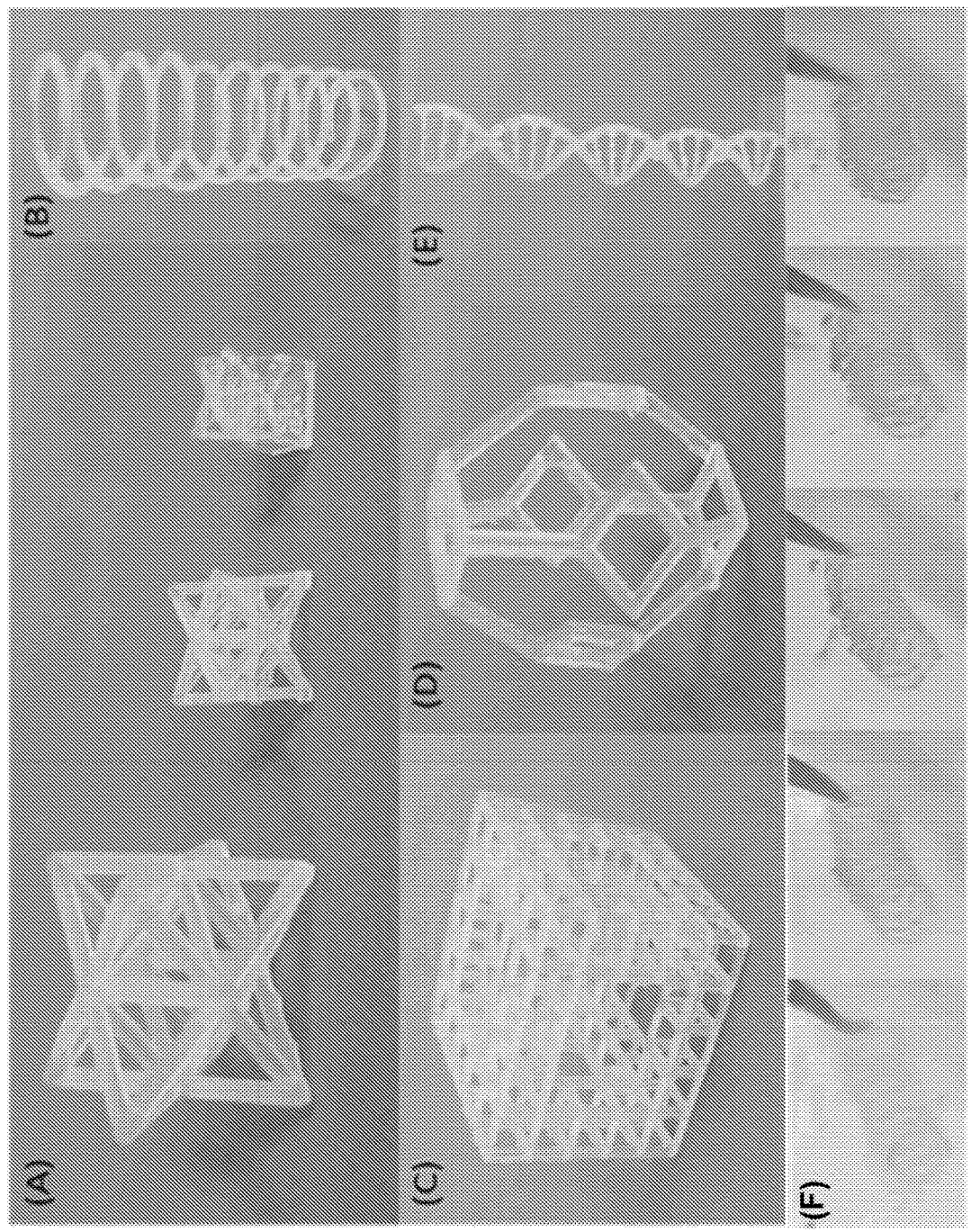
FIG. 18 shows some octet and helical structures printed as examples.

FIG. 18 shows some octet and helical structures printed as examples. For example, various shapes made of the vitrimer-based SMP can be printed by SLA, Octet structures (A); Helical structures (B) and (E); and Lattice structures (C) and (D). A programmed spring recovers to its original length in a boiled water bath (F).

In some embodiments, the disclosed polymer may be used for fast-curing polymer/glass concrete. In order to show the capability for the polymer to recycle waste glass, and transform the solid waste to useful construction materials by 3D printing, polymer concrete is prepared and tested. It is envisioned that, due to the use of transparent glass and polymer, the concrete may allow a certain amount of sunlight penetrate into the building if the concrete is used to construct the building wall, saving electricity or energy.

In this example, the waste glass is collected from broken glass beakers in the lab. Glasses are manually crushed and then small glass pieces and particles (GPPs) (FIG. 19A) with the sizes ranging from about 0.075 to about 2.36 mm are sieved by a set of two sieves (0.075 mm sieve and 2.36 mm sieve). The obtained GPPs are first rinsed with deionized water for three times and then immersed in a silane solution (e.g., 6 vol % 3-(Trimethoxysilyl) propyl methacrylate in ethanol) at about 65° C. for about 16 hours. After that, the silane solution is decanted and the GPPs are rinsed with acetone thoroughly for 6 times. The silane-treated GPPs are dried in an oven at about 70° C. for another about 16 hours.

Figure 19:
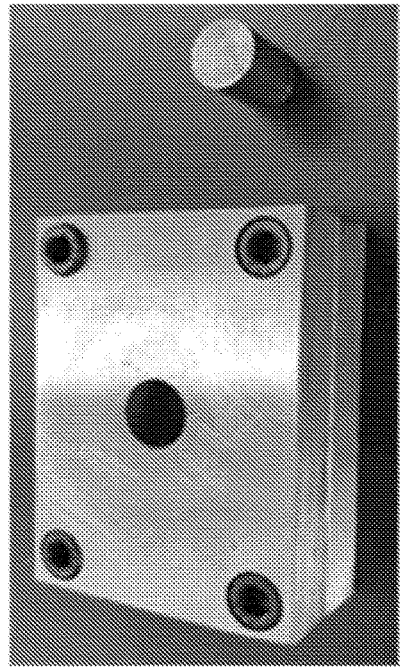
FIG. 19 shows (A) the silane-treated glass pieces and particles, (B) the steel mold and the cylindrical steel press, (C) the UV-cured fast-curing polymer concrete with 60 MPa pre-compression stress.
Figure 19:
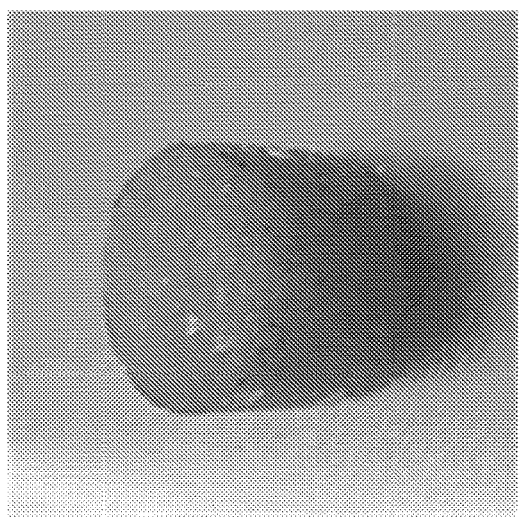

Some solid wastes such as flyash have been used to prepare pre-cast building blocks for constructing the wall of tall buildings. This example intends to fabricate similar pre-cast building blocks for construction industry. To prepare the fast-curing polymer/glass concrete (FCPC), the 3D/4D printable resin is mixed with the silane treated GPPs and stirred well. Releasing agent is first applied to the inside of a steel mold with a circular hole (diameter=12 mm). The resin/GPPs mixture is loaded into the steel mold and steel cylinder is then put on the top of the resin/GPP mixture as a press (FIG. 19B). Varying pre-applied compression stress (from about 5 to about 100 MPa) is then applied onto the steel mold and kept for about 5 mins using MTS. The press is then removed and the compacted polymer/GPP mixture is cured within the steel mold under UV irradiation (about 7 mW/cm$^2$) for about 1 hour. The steel mold is detached and the top part of the steel containing the cured polymer concrete is flipped over and post-cured for another about 15 minutes. An external stress is applied onto the steel cylinder to push the FCPC out of the steel mold using MTS. The specimen height and polymer volume fraction under different molding stresses are summarized in Table 4 and atypical cured specimen is shown in FIG. 19C.

TABLE 4

Summary of the specimen height and resin volume fraction in terms of corresponding pre-compression or molding stress. (The diameter of all the cylindrical specimens is about 12 mm.)

| Pre-compression or molding stress (MPa) | Specimen Height (mm) | Resin Volume Fraction (Vol %) |
|---|---|---|
| 5 | 9.3 | 27.2 |
| 10 | 9 | 25 |
| 20 | 7.9 | 16.5 |
| 60 | 7.6 | 16.8 |
| 100 | 6.9 | 9.5 |

It is noted that, while a steel mold and compression molding stress are used to prepare the FCPC specimens, this process can also be completed by 3D printing. For example, the viscosity of the concrete is appropriate for printing using cement concrete 3D printers. In particular, if the conventional concrete 3D printer is modified so that if it can apply a certain compressive stress while printing, the printed dense layer can be cured by direct sunlight or UV lamp.

Figure 20:
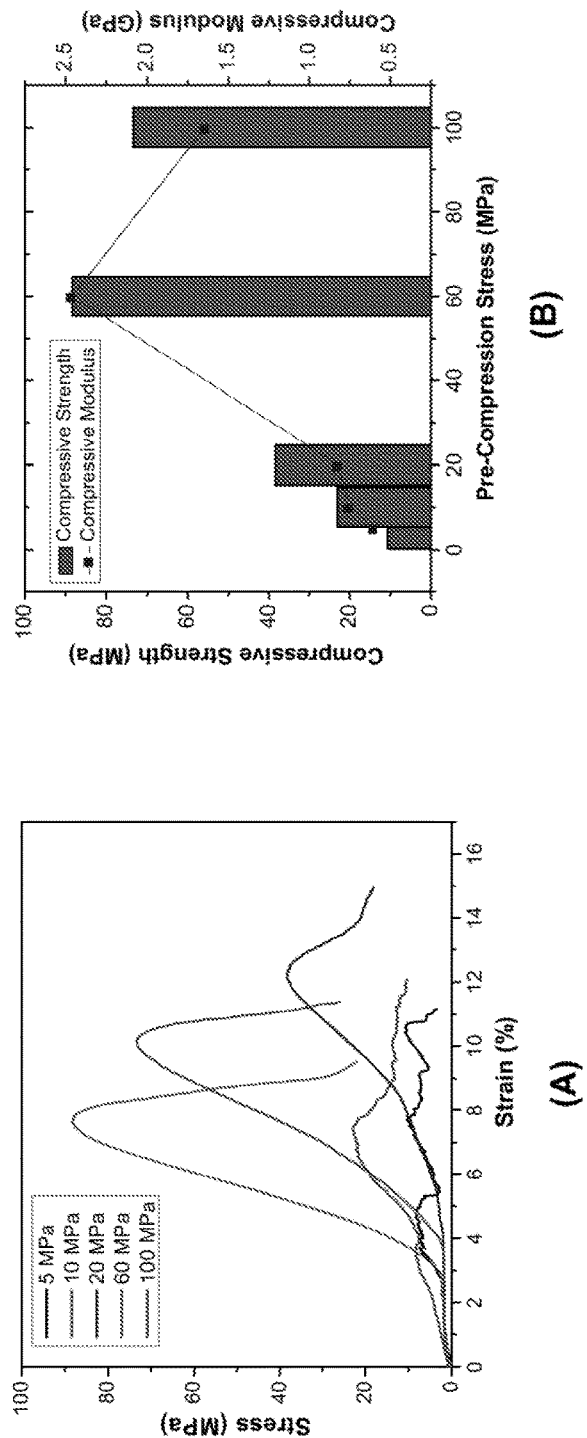
FIG. 20 shows (A) the compressive behavior of FCPC specimens prepared under different pre-compression or molding stresses, (B) the compressive strength and the compressive modulus of the FCPC specimens prepared under different compressive molding stresses, (C) a typical brittle failure mode of the FCPC cylindrical specimen after compression
Figure 20:

The compressive strength of the cylindrical FCPC specimen (FIG. 19C) is tested by a MTS Q-TEST 150 machine with 1 mm/min loading rate. The compressive test results are very typical of polymer concrete, or even cement concrete. The stress increases non-linearly with strain, until a peak stress is achieved, followed by quick post-peak strain softening and failure (FIG. 20C). When the pre-compression stress is less than about 20 MPa, the specimens have lower compressive strength and modulus (FIG. 20B) due to the existence of voids and bubbles (FIG. 20A). When the pre-compression or molding stress is about 60 MPa, the FCPC is mostly compact and exhibits the highest compressive strength (about 88.3 MPa) and modulus (about 2.5 GPa) (FIG. 20B). The 20 MPa pre-stress molded specimen results in 38.4 compressive strength due to existing voids and bubbles. Too much resin is squeezed out of the mold, and some particles may be broken under about 100 MPa molding stress, leading to decreased compressive strength of the FCPC as compared to 60 MPa molding stress. It is noted that, for traditional cement concrete, 3D printing faces a considerable challenge, i.e., how to balance the conflicting requirement between workability or printability (needs higher water/cement ratio) and dry shrinkage and strength (needs lower water/cement ratio). The FCPC, as a water free composition, solved this challenge.

In another embodiment, 3D printable and recyclable shape memory polymer is provided by mixing 2-hydroxy-2-methylpropiophenone (3.5 wt %), bis(2,4,6-trimethylbenzoyl)-phenylphosphineoxide (1 wt %), triethylamine (0.5 wt %), 1,4-butanediol dimethacrylate (20 wt %) in bisphenol A glycerolate dimethacrylate (BPAGMA, 200 g) at about 72° C. for about 4 hours. All the reagents can be purchased from Sigma Aldrich and used as received. The glass transition temperature is about 95° C. based on the peak of tan&. The tensile strength is about 62 MPa, the compressive strength is about 190 MPa, the Young's modulus is about 1,460 MPa, the ultimate tensile strain is about 5.0%, and the ultimate compressive strain is about 30.0%, all at room temperature. The polymer has excellent shape memory effect with a shape recovery ratio about 100% and recovery stress about 13.4 MPa. Lattice structures with various unit cells such as Octet, Kelvin, and Cubic unit cells, are printed by the Asiga Pico2-39 SLA 3D printer (28 mW/cm$^2$, 385 nm) using the as-prepared resin with 0.15 mm layer thickness. Self-similar two length-scale lattice structures with Octet unit cell are also printed. The lattice structures with cubic unit cell exhibit a compressive strength compatible to metallic lattice structures with the same apparent density. Further, the cubic lattice structures demonstrate excellent shape memory effect, high recovery stress (about 3.4 MPa), and good recycling efficiency (tensile strength about 17.6 MPa after first recycling).

In conclusion, three main issues that restrict the engineering applications of current HPSMPs are their complex fabrication processes, lack of recyclability, and low recovery stress and energy output. To address all the critical issues simultaneously, a UV-curable and recyclable thermoset VSMP with high stress and energy output is synthesized, which can be prepared under UV irradiation for only 80 s at room temperature. The VSMP exhibits high mechanical properties (tensile strength=36.7 MPa, ultimate tensile strain=8%, compressive strength=230 MPa, and storage shear modulus is about 3,000 MPa) at room temperature. Good thermal stability of the VSMP has been demonstrated by its compressive behavior at elevated temperature (compressive strength=187 MPa at 120° C.). The recyclability of the SMP is investigated by grinding the thermoset into small particles via ball milling. An optimal recycling condition is found (at 150° C. and under 14 MPa pressure for 2 hours), which led to more than 60% recycling efficiency for two recycling cycles. In addition, the SMP possesses good shape memory effect for multiple shape recovery cycles. Due to the highly constrained network, comparatively large shape recovery stress up to 13.4 MPa can be obtained with 1.05 MJ·m$^{-3}$ energy output in rubbery state. Some exemplary embodiments show that the UV curing time is readily adjustable and so that the VSMP can be used as 3D/4D printing ink by using the SLA 3D printer with complex shapes and high resolution. As discussed above, a new formulation not only yields high tensile strength up to about 62 MPa, but is also used to print complex lattice structures with high resolutions. The new multifunctional VSMP may be used as adhesives, coatings, 3D printing inks, and actuators to broaden the applications of the HPSMP in engineering.

In this invention, a new group of thermosets is disclosed. Those thermostes: (1) are cured by UV light in the range from several tenths seconds to several tens of seconds, suggesting that it can be printed either by conventional layer by layer deposition method (stereolithography (SLA) process) or by printing in a liquid supporting bath (Jin Y, Liu C, Chai W, Compaan A, and Huang Y. Self-Supporting Nanoclay as Internal Scaffold Material for Direct Printing of Soft Hydrogel Composite Structures in Air. *ACS Applied Materials and Interfaces*, 9: 17456-17465, (2017)); (2) are healable and recyclable for more than one time and solvent based recylcing may make the VSMP printable for more than one time; (3) have perfect shape memory effect with shape recovery ratio about 100% and large recovery stress of about 13.4 MPa and energy output about 1.1 MJ/m3; (4) have mechanical properties similar to those of conventional thermosets such as tensile strength of about 36 MPa-about 62 MPa and modulus of elasticity of about 1,400 MPa-about 3,000 MPa at room temperature, suggesting that it can replace conventional thermosets such as epoxy in load bearing structures but with additional functionality such as significantly reduced curing time (from hours, days, or weeks to seconds), shape memory, and recyclability (can be recycled more than one time with healing efficiency of more than 60% as measured by the tensile strength of the recycled polymer).

Further, the disclosed thermosets may have commercial applications. Due to the combination of several amazing structural and functional properties, these polymers have a great potential to be used in many sectors of industry such as (1) load carrying structures (aircraft, car, ship, pipeline, pressure vessel, wind turbine blade, offshore platform; etc.); (2) consumer goods (door, window, dry wall, sink, swimming pool, bilk, pole, etc.); (3) oil and gas (proppant, loss circulation material, expandable cement, etc.); (4) infrastructure (bridge deck, fiber reinforced polymer for repair, rehabilitation, reinforcement, and reconstruction of concrete structures, sealant, etc.); and high tech (soft robots, actuators, sensors, etc.).

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A construction material formed from a recycled vitrimer-based thermoset shape memory polymer (VSMP) prepared by:
   a method comprising:
      i) grinding an initial VSMP into a powder; and
      ii) molding the powder into the recycled VSMP at an elevated temperature and a high pressure;
   or a method comprising:
      i) dissolving the initial VSMP in one or more solvents; and
      ii) evaporating the solvent to provide the recycled VSMP;
   wherein the initial VSMP comprises:
      a vitrimer-based monomer comprising 1) a first unit rendering a high chain stiffness upon polymerization of the monomer; and 2) a second unit comprising a photopolymerizable unit for photopolymerization of the monomer under a UV irradiation,
      a fast-curing polymer concrete with transparent glass as aggregates, and
      a photoinitiator.

2. The construction material of claim 1, wherein the construction material is formed from the method comprising:
   i) grinding the VSMP into a powder; and
   ii) molding the powder into a recycled VSMP at an elevated temperature and a high pressure.

3. The construction material of claim 2, wherein the first unit rendering a high chain stiffness comprises a bisphenol A unit.

4. The construction material of claim 2, wherein the vitrimer-based monomer is a bisphenol A glycerolate dimethacrylate (BPAGMA) monomer.

5. The construction material of claim 2, wherein the recycling comprises transesterification.

6. The construction material of claim 2, wherein the high pressure is about 6-14 MPa.

7. The construction material of claim 2, wherein the elevated temperature is about 130° C. to about 175° C.

8. The construction material of claim 1, wherein step ii) is performed for about 2 hours to about 10 hours.

9. The construction material of claim 1, wherein the initial VSMP is a recycled VSMP.

10. The construction material of claim 1, wherein the method has a recycling efficiency of more than 60% wherein the recycling efficiency equals 100% times the tensile strength of the recycled VSMP divided by tensile strength of the initial VSMP before recycling.

11. The construction material of claim 1, wherein the construction material is formed from the method comprising:
    i) dissolving the initial VSMP in one or more solvents; and
    ii) evaporating the solvent to provide a recycled VSMP.

12. The construction material of claim 11, wherein the first unit rendering a high chain stiffness comprises a bisphenol A unit.

13. The construction material of claim 11, wherein the vitrimer-based monomer is a bisphenol A glycerolate dimethacrylate (BPAGMA) monomer.

14. The construction material of claim 11, wherein the one or more solvents are selected from the group consisting of ethylene glycol, propylene glycol, 1,3-butanediol, diethylene glycol, 2-ethyl-hexanol, cyclohexanol, benzyl alcohol, dimethyl sulfoxide, n-methyl-2-pyrrolidone, and combinations thereof.

15. The construction material of claim 11, wherein the VSMP is dissolved in the presence of a catalyst.

16. The construction material of claim 15, wherein the catalyst is 1,5,7-triazabicyclo[4,4,0]dec-5-ene.

17. The construction material of claim 11, wherein the recycled VSMP is a 3-D printing ink.

18. The construction material of claim 11, wherein the VSMP is a VSMP concrete comprising the vitrimer-based monomer, a photoinitiator, and a fast-curing polymer concrete with transparent glass as aggregates.

* * * * *